(12) United States Patent
Burdick

(10) Patent No.: US 6,359,040 B1
(45) Date of Patent: Mar. 19, 2002

(54) AQUEOUS SYSTEMS COMPRISING AN IONIC POLYMER AND A VISCOSITY PROMOTER, PROCESSES FOR THEIR PREPARATION, AND USES THEREOF

(75) Inventor: Charles L. Burdick, Landenberg, PA (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 09/309,289

(22) Filed: May 11, 1999

Related U.S. Application Data
(60) Provisional application No. 60/086,048, filed on May 12, 1998.

(51) Int. Cl.$^7$ ................................ C08J 5/10; C08L 1/26
(52) U.S. Cl. ............................ 524/43; 524/44; 524/45; 524/47; 524/50; 524/521; 524/522; 524/517; 524/519; 523/402
(58) Field of Search ............................. 524/43, 44, 45, 524/47, 50, 521, 522, 517, 519; 523/402

(56) References Cited

U.S. PATENT DOCUMENTS

| | | |
|---|---|---|
| 3,049,469 A | 8/1962 | Davison |
| 3,058,873 A | 10/1962 | Keim et al. |
| 3,719,503 A | 3/1973 | Podlas |
| 3,727,687 A | 4/1973 | Clampitt et al. |
| 3,800,872 A | 4/1974 | Friedman |
| 3,941,728 A | 3/1976 | Solenberger |
| 4,035,195 A | 7/1977 | Podlas |
| 4,040,900 A | 8/1977 | Mazzarella et al. |
| 4,146,669 A | 3/1979 | Dikler et al. |
| 4,279,794 A | 7/1981 | Dumas |
| 4,299,817 A | 11/1981 | Hannan, III et al. |
| 4,501,834 A | 2/1985 | Su |
| 4,517,333 A | 5/1985 | Lundberg et al. |
| 4,610,801 A | 9/1986 | Matthews et al. |
| 4,618,491 A | 10/1986 | Kanematu et al. |
| 4,828,757 A | 5/1989 | Naylor et al. |
| 4,970,260 A | 11/1990 | Lundberg et al. |
| 5,096,490 A * | 3/1992 | Burdick ...................... 106/171 |
| 5,110,878 A * | 5/1992 | Amey ........................ 525/430 |
| 5,112,445 A | 5/1992 | Winston, Jr. et al. |
| 5,141,797 A | 8/1992 | Wheeler |
| 5,318,669 A | 6/1994 | Dasgupta |
| 5,338,406 A | 8/1994 | Smith |
| 5,338,407 A | 8/1994 | Dasgupta |
| 5,362,573 A | 11/1994 | Pandian et al. |
| 5,385,764 A | 1/1995 | Andersen et al. |
| 5,460,645 A | 10/1995 | Pandian et al. |
| 5,472,485 A | 12/1995 | Pandian et al. |
| 5,502,091 A | 3/1996 | Dasgupta |
| 5,532,212 A * | 7/1996 | Patel .......................... 507/140 |
| 5,685,815 A | 11/1997 | Bottorff et al. |
| 5,846,663 A | 12/1998 | Brungardt et al. |
| 6,030,673 A | 2/2000 | Andersen et al. |

FOREIGN PATENT DOCUMENTS

| | | |
|---|---|---|
| EP | 362770 | 4/1990 |
| EP | 0455073 | 11/1991 |
| EP | 537359 | 4/1993 |
| EP | 629741 | 12/1994 |
| EP | 666368 | 8/1995 |
| GB | 903416 | 8/1962 |
| GB | 1373788 | 11/1974 |
| GB | 1533434 | 11/1978 |
| JP | 12369/77 | 4/1977 |
| RU | 1266914 | 10/1986 |
| RU | 1266916 | 10/1986 |
| RU | 1266917 | 10/1986 |

OTHER PUBLICATIONS

English language abstract of JP 1 236 9/77.
English language abstract of SU 1,266,917.
English language abstract of SU 1,266,916.
English language abstract of SU 1,266,914.
*The Sizing of Paper*, 2nd ed., C.E. Farley and R. B. Wasser, edited by W. F. Reynolds, Tappi Press, 1989, pp. 51–62.

* cited by examiner

Primary Examiner—James J. Seidleck
Assistant Examiner—U. K. Rajguru
(74) *Attorney, Agent, or Firm*—Martin F. Sloan

(57) ABSTRACT

Aqueous compositions having advantageous Theological properties, preferably including any of enhanced yield stress, enhanced viscosity, and/or enhanced water retention, are disclosed. Included are low-viscosity compositions having high yield stress. The present invention also relates to processes for preparing and using the compositions. Compositions of the present invention comprise aqueous compositions of a polymer having a net ionic charge, and a viscosity promoter having an opposite net ionic charge. Compositions may also comprise a moderating agent to prevent precipitation and/or gelation.

135 Claims, No Drawings

AQUEOUS SYSTEMS COMPRISING AN IONIC POLYMER AND A VISCOSITY PROMOTER, PROCESSES FOR THEIR PREPARATION, AND USES THEREOF

CROSS-REFERENCE TO RELATED APPLICATIONS

This application claims priority to U.S. Provisional Application 60/086,048, filed May 12, 1998, which is hereby incorporated by reference in its entirety.

FIELD OF THE INVENTION

This invention relates to compositions having advantageous Theological properties comprising an ionic polymer and a viscosity promoter. The invention also relates to processes for preparation and use of compositions having advantageous rheological properties, as well as to compositions and methods for treating paper.

BACKGROUND OF THE INVENTION

It is desired by various industries to employ rheology modifiers to achieve thickening, flow control, water retention, and other properties in aqueous systems. A number of rheology modifiers are commercially available such as sodium carboxymethyl cellulose, guar gum, sodium alginate, hydroxyethylcellulose, alkali-soluble latices, xanthan gum, polyacrylamide and so forth.

The hydrophilic groups that these various water-soluble polymers express may be classified as non-ionic, anionic, or cationic. Anionic or cationic water-soluble polymers are most commonly employed in the absence of an oppositely-charged polymeric species, due to problems of incompatibility. For example, in cases where anionic polymers are employed, such as paper coatings, these polymers are traditionally employed without the use of a cationic additive being present, because cationic additives will typically precipitate most anionic water-soluble polymers, and thus reduce their effectiveness. Similarly, the overwhelming majority of the commercial use of either anionic or cationic polymers finds these additives employed with the oppositely-charged species being avoided. It is also known that the presence of polyvalent cationic inorganic salts, such as calcium or aluminum salts, can adversely affect the solubility and effectiveness of anionic polymers.

However, even though the presence of polyvalent cationic solutes is usually avoided in applications in which anionic water-soluble polymers are employed, there have been occasional findings disclosed where an anionic polymer has been used with either cationic water-soluble polymers or cationic inorganic salts. These include the following:

U.S. Pat. No. 3,049,469 presents the use of the anionic water-soluble polymer sodium carboxymethyl cellulose in conjunction with a cationic polymer polyamide-epichlorohydrin copolymer for enhancing the strength of paper.

U.S. Pat. Nos. 5,502,091, 5,318,669, and 5,338,407, describe mixtures of cationic and anionic guar for enhancing the dry strength of paper.

U.S. Pat. No. 5,338,406 and family member EP 0362770 describe mixtures of high molecular weight cationic water-soluble polymers, such as cationic guar or cationic polyacrylamide, with anionic polymers for enhancing the dry strength of paper.

U.S. Pat. No. 3,719,503 describes the formation of water-based gels by means of specific mixtures of anionic water-soluble polymers with aluminum salts.

U.S. Pat. No. 4,035,195 discloses the use of sodium carboxymethyl hydroxyethylcellulose and cross linking cationic additives, such as chromium or aluminum salts, for the purpose of thickening brine solutions for oil field applications.

In most cases, such as in U.S. Pat. Nos. 3,049,469, 3,058,873, 3,719, 503, 5,502,091, 5,318,669, 5,338,407, and 5,338,406, anionic and cationic polymers are mixed in sequence with colloids, such as paper fibers or suspended particulates, in order to facilitate adsorption/flocculation of the colloids with the water-soluble polymers. Therefore, the water-soluble polymers are wholly removed from the aqueous phase and enhanced viscosity of the polymeric solution in solution is not obtained.

SUMMARY OF THE INVENTION

The present invention relates to aqueous compositions having advantageous rheological properties, preferably including any of enhanced yield stress, enhanced viscosity, enhanced water retention, and combinations thereof. The present invention also relates to processes for preparing and using the compositions.

Compositions of the present invention can be prepared with an interactive mixture of ionic water-soluble polymer combined in solution with vicosity promoter for the ionic polymer, the viscosity promoter having a net ionic charge opposite to that of the ionic polymer. Compositions of the present invention optionally comprise moderating agent to prevent or reduce precipitate formation and/or gelation. The aqueous solutions of the present invention exhibit unexpected rheological properties, and are useful in various applications, such as size press surface treatment of paper, and paper coating rheology control.

The process of size press treatment of paper is commonly used to coat paper. In this process, a previously formed sheet is fed through the size press, where a solution of dissolved starch is typically added to one or both sides of the paper, typically adding about 3–5 wt % solids to the paper by dry weight of the untreated paper. Paper sheets are typically very absorbent, leading to a large penetration of the starch solution into the pores of the paper. This penetration is undesirable because the coating is typically needed on the surface of the paper, not in the pores. Thus, penetration of the solution requires addition of more starch to obtain the desired coating, which results in a loss of efficiency.

Although mixtures of anionic guar with cationic guar, as well as mixtures of anionic polyacrylamide copolymers with cationic polyacrylamide copolymers, have been used for various purposes in the papermaking art, these combinations are inoperable in the present invention due to strong precipitate formation. Thus, the present invention differs in kind from prior art compositions with respect to the chemical nature of the combined polymer species. The present invention also differs from the prior art in the ratios and concentrations employed to prepare solutions of a novel rheological mixture. Novelty of the present invention becomes evident with the recognition that the prior art, in most cases, teaches away from successful mixtures of anionic polymers and cationic viscosity promoters.

In the papermaking industry, there is a need for compositions and processes that are better able to keep a coating composition from penetrating deeply into paper pores, thereby increasing the coating efficiency. Such efficiency is desirable because, among other things, it reduces the amount of additives, e.g., strengthening agents and sizing agents, needed.

There is also a need for compositions and processes that are capable of efficiently sealing pores in paper, resulting in paper with reduced porosity.

In one aspect, the present invention provides aqueous compositions comprising at least one first ionic polymer and at least one viscosity promoter, the at least one viscosity promoter comprising at least one second ionic polymer having a net ionic charge opposite to that of said at least one first ionic polymer, the aqueous composition having a yield stress greater than about 5 dynes/cm$^2$.

In another aspect, the invention provides an aqueous composition prepared by combining at least one first ionic polymer, at least one viscosity promoter, and an aqueous medium, the at least one viscosity promoter comprising at least one second ionic polymer having a net ionic charge opposite to that of said first ionic polymer, the aqueous composition having a yield stress greater than about 5 dynes/cm$^2$.

In another aspect, the invention provides an aqueous composition comprising water, at least one first ionic polymer and at least one viscosity promoter, the at least one viscosity promoter comprising at least one second ionic polymer having a net ionic charge opposite to that of the at least one first ionic polymer, the aqueous composition having a yield stress at least about 10% higher than the yield stress of a composition having about the same viscosity as the aqueous composition, and the same ingredients as said aqueous composition but for the absence of at least one of the at least one first ionic polymer or at least one viscosity promoter.

In another aspect; the invention provides an aqueous composition comprising water, at least one first ionic polymer and at least one viscosity promoter, the at least one viscosity promoter comprising at least one second ionic polymer having a net ionic charge opposite to that of the at least one first ionic polymer, the aqueous composition having a viscosity greater than the viscosity of a composition having the same ingredients and concentrations of ingredients as the aqueous composition but for the absence of either the at least one first ionic polymer or the at least one viscosity promoter, where the concentration of an ingredient is measured as weight % based on total weight.

In another aspect, the invention provides an aqueous composition comprising at least one ionic polymer, at least one viscosity promoter, and at least one moderating agent, the at least one ionic polymer having a net ionic charge opposite to that of the at least one viscosity promoter, the at least one moderating agent being present in an amount effective to prevent formation of a precipitate or gel, the precipitate or gel comprising an interactive complex of the at least one first ionic polymer and the at least one viscosity promoter.

In another aspect, the present invention provides a method of coating a porous surface, the method comprising applying to the surface an aqueous composition comprising at least one first ionic polymer and at least one viscosity promoter, the at least one ionic polymer having a net ionic charge opposite to that of the at least one viscosity promoter.

In another aspect, the present invention provides a process for surface sizing paper comprising using any of the compositions of the invention, as well as paper, preferably sized paper, coated by the compositions and/or methods. A preferred method comprises: a) providing paper; b) applying an aqueous composition according to the invention to at least one surface of the paper; and c) drying the paper to obtained surface sized paper.

In yet another aspect, the present invention provides a method of reducing porosity of a porous surface, preferably a fibrous sheet, more preferably paper, comprising applying a composition of the invention to the porous surface. The invention also includes porous surfaces, fibrous sheets, and paper which are coated by methods and/or compositions of the present invention.

The aqueous compositions preferably have yield stresses which are greater than about 5 dynes/cm$^2$, more preferably greater than about 10 dynes/cm$^2$, more preferably greater than about 20 dynes/cm$^2$, more preferably greater than about 30 dynes/cm$^2$, more preferably greater than about 50 dynes/cm$^2$, even more preferably greater than about 70 dynes/cm$^2$.

Additionally, the aqueous compositions preferably have yield stresses at least about 10% higher, preferably at least about 50% higher, more preferably at least about 100% higher, even more preferably at least about 200% higher, than the yield stress of a composition having about the same viscosity as the aqueous composition, and the same ingredients as said aqueous composition but for the absence of at least one of the at least one first ionic polymer or at least one viscosity promoter.

The Brookfield viscosities of the aqueous compositions are preferably less than about 10,000 cps, more preferably less than about 5,000 cps, more preferably less than about 1,000 cps, more preferably less than about 500 cps, even more preferably less than about 300 cps, and can be less than about 200 cps or less than about 100 cps. The Brookfield viscosities are preferably greater than about 50 cps.

Compositions of the present invention preferably include any of solutions, microemulsions, emulsions, dispersions and suspensions.

The at least one first ionic polymer preferably has a net anionic charge, and preferably comprises at least one of anionic polysaccharide, anionic polysaccharide derivative, anionic synthetic polymer, or combination thereof.

Preferred first ionic polymers which are anionic polysaccharides include carrageenan, pectin, sodium alginate, and combinations thereof.

Preferred first ionic polymers which are anionic polysaccharide derivatives include carboxymethyl cellulose, sodium carboxymethylcellulose, carboxymethyl guar, carboxymethylhydroxypropyl guar, carboxymethylhydroxyethyl cellulose, sodium carboxymethyl hydroxyethylcellulose, methylcarboxymethyl cellulose, carboxymethyl starch, sodium alginate, alkali-soluble latex, and combinations thereof Preferred first ionic polymers which are anionic synthetic polymers include anionic acrylamide copolymer, amphoteric acrylamide copolymer, polyacrylic acid, acrylic acid copolymer, and combinations thereof Preferably, a solution having 10 wt % or less of the at least one first ionic polymer in water has a Brookfield viscosity at ambient temperature in excess of about 1,000 cps.

The at least one viscosity promoter preferably includes at least one second ionic polymer, at least one salt having a polyvalent cationic functionality, and combinations thereof. Compositions of the present invention can include the at least one salt in addition to the at least one second ionic polymer.

Preferably, the at least one second ionic polymer comprises at least one cationic polyacrylamide; epihalohydrin reaction product of polyaminoamnides obtained by reaction of polyamines with dicarboxylic acids; polymer of diallyldimethyl ammonium chloride, polyamide-epichlorohydrin resin, polymerization product of quaternary monomers, copolymer of quaternary monomers with other reactive monomers, adduct of quaternary epoxides with water-soluble polymers, epichlorohydrin reaction product of a polyaminoamide obtained by reaction of adipic acid with diethylene triamine, and combinations thereof.

Preferably, a solution having 5 wt % of the at least one second ionic polymer in water has a viscosity has a Brookfield viscosity at ambient temperature less than about 2,000 cps.

The at least one salt having a polyvalent functionality, which is preferably cationic, preferably includes divalent or trivalent functionalities, or combinations thereof. A preferred salt is an inorganic salt, which preferably comprises at least one multivalent metal cation, and preferably comprises a salt of at least one of aluminum, magnesium, iron III, calcium, zinc, and combinations thereof The charge density of the at least one first ionic polymer is preferably at least about 0.5 meq/gram. The charge density of the at least one viscosity promoter is preferably at least about 0.4 meq/gram. The charge ratio of the at least one first ionic polymer to the at least one viscosity promoter is preferably greater than 1:1, more preferably greater than about 1:0.6, more preferably greater than about 1:0.4, more preferably greater than about 1:0.3, even more preferably greater than about 1:0.2, most preferably greater than about 1:0.1.

The compositions can include at least one moderating agent present in an amount effective to prevent formation of precipitate or gel, the precipitate or gel comprising an interactive complex of the at least one first ionic polymer and the at least one viscosity promoter, which precipitate or gel would form in the absence of the moderating agent. Preferably, the at least one moderating agent comprises at least one of an inorganic salt having a divalent cationic functionality, salt of a carboxylic acid, a starch solution, and combinations thereof The aqueous composition of the current invention preferably has a gravimetric water retention value that is smaller, preferably at least about 10% smaller, than a composition having the same ingredients at the same concentrations but for the absence of either said at least one first ionic polymer or said at least one second ionic polymer.

Compositions and processes according to the present invention include additives. Preferred additives include sizing agents; natural, semisynthetic, or synthetic polymers; latex colloids; pigments; clays; fillers; biocides; surfactants; antistatic agents; anti-foaming agents; binders (e.g., latex binders); retention aids; strengthening agents; and combinations thereof.

Preferred sizing agents include cellulose-reactive sizing agents. Preferred sizing agents include alkyl ketene dimers, alkyl ketene multimers, succinic acid anhydrides, styrene maleic anhydrides, styrene maleic anhydride copolymers, starches, hydrophobic latex polymers, organic epoxides, acyl halides, fatty acid anhydrides, organic isocyanates, and combinations thereof.

Paper sized according to the present invention preferably has a higher level of sizing as measured by the Hercules Size Test than paper sized with a surface sizing composition that is the same but for the absence of said at least one viscosity promoter.

Preferably, paper coated and/or sized using a composition of the present invention has a higher Gurley porosity than paper sized with a surface sizing composition that is the same except but for the absence of said at least one viscosity promoter.

Preferred compositions of the invention are any of paper coating compositions, paper sizing compositions, paints (e.g., latex paints), oil field drilling muds, oil field fracturing fluids, water clarification compositions, and retention aids.

As noted, the present invention includes the above compositions and methods, as well as preparation of the compositions, use of the compositions, and products prepared using compositions and/or methods of the present invention.

DETAILED DESCRIPTION OF THE INVENTION

Unless otherwise stated, all percentages, parts, ratios, etc., are by weight. By "ambient temperature" is meant about 25° C.

Unless otherwise stated, a reference to a compound or component includes the compound or component by itself, as well as in combination with other compounds or components, such as mixtures of compounds.

Further, when an amount, concentration, or other value or parameter, is given as a list of upper preferable values and lower preferable values, this is to be understood as specifically disclosing all ranges formed from any pair of an upper preferred value and a lower preferred value, regardless whether ranges are separately disclosed.

Yet further, unless otherwise stated, the term anionic polymer, as used herein, refers to polymers having a net anionic charge, and thus includes amphoteric polymers having a net anionic charge. Similarly, unless otherwise stated, the term cationic polymer, as used herein, refers to polymers having a net cationic charge, and thus includes amphoteric polymers having a net cationic charge.

Yield stresses are measured herein with an AR1000 rheometer (TA Instruments, Newcastle, Del.) using the flow test at shear rates of 0.2 sec$^{-1}$ to 288 sec$^{-1}$. For aqueous compositions not including a starch or starch derivative, the yield stress is measured at 25° C. For aqueous compositions including a starch or starch derivative, the yield stress is measured at 65° C. The sample containers used are the double gap bob & cup tools. There is a 3 mm opening between the two cylinders of the tools. Approximately 8 ml of test composition are placed in the cup, a cap device is placed over the filled bob and cup to minimize evaporation of the fluid during testing, and the test is started. The instrument measures the shear stress as shear rate increases from low to high settings. The data are then analyzed using the Casson model, and the yield stress of the sample is thereby obtained.

One of the rheological properties modifiable in the present invention is viscosity. There are many methods for measuring viscosity, and commonly used methods vary depending on the industry. Where viscosities of compositions are to be compared (such as by ratios or by percentage increases or decreases) any method of measuring viscosity is appropriate as long as the determinations are run in the same manner and under the same conditions for all compositions to be compared. Such methods include, but are not limited to, Brookfield viscosity and Stormer viscosity.

As used herein for compositions having defined Brookfield viscosities, viscosities are neasured with an LVT Viscometer using a spindle speed of 12 rpm. For compositions not including a starch or starch derivative, viscosity is measured at about 25° C. For compositions including a starch or starch derivative, viscosity is measured at about 60°–70° C., e.g., 65° C. For viscosities in the range of about 0–450 cps, a #1 spindle is used, for viscosities in the range of about 450–2,250 cps, a #2 spindle is used, for viscosities in the range of about 2,250–9,000 cps, a #3 spindle is used, and for viscosities in the range of about 9,000–45,000 cps, a #4 spindle is used.

For pigmented paper coating compositions, viscosities may be measured using an RVT Viscometer and a spindle speed of 100 rpm, at about 25° C. For viscosities in the range of about 0–1,800 cps, a #4 spindle is used, for viscosities in the range of about 1,800–3,600 cps, a #5 spindle is used, and for viscosities in the range of about 3,600–9,000 cps, a #6 spindle is used.

The scientific literature teaches that the rate of penetration of aqueous solutions into porous substrates should be the same for solutions of similar viscosity. However, it has now been found that solutions of the present invention, mixtures of water-soluble ionic polymers with viscosity modifiers, exhibit significantly lower penetration of the mixture into an absorptive substrate compared to control solutions at equivalent viscosities.

Equations describing the absorption rate of solutions into porous media are published in the scientific literature, including the Lucas-Washburn equations and Darcy's law. Darcy's law is approximated by the following expression:

$$V_0 \propto \frac{KP}{\eta} \quad (1)$$

in which $V_0$ is the rate of solution absorbance into a porous substrate, K is the permeability of the surface, P is an applied pressure term, and $\eta$ is the solution viscosity. While this equation is adequate for Newtonian fluids, it is proposed that this equation does not adequately describe the behavior of polymeric solutions.

In many industrial processes and applications, a modifier is added to water or other aqueous liquid in order to control the rheological properties and thereby obtain useful flow properties. One such rheological property is the "yield stress," which is the critical stress, or rate of shear, that must be exceeded in order to make some non-Newtonian liquids flow. The yield stress is related to the ability of a solution to act as a suspending aid. The yield stress of a composition is an intrinsic property of the composition. The yield stress is, therefore, independent of the nature of a surface or container in contact with the composition.

In Equation 1, pressure term P, can, in static situations, be equivalent to capillary pressure. Thus, P depends on a host of factors, such as the pore size of the surface, and the wettability, or contact angle, between the fluid and the surface. Thus, P is not an intrinsic property of the fluid, but is dependent on the properties of, and interactions between, the surface and the fluid. Without being bound by theory, it is believed that the yield stress of a composition, though an intrinsic property of the composition, is also related to the absorption rate of a fluid into a surface. It is believed that the yield stress effectively reduces the applied pressure, P, in Equation 1, thereby reducing the rate of absorption. Thus, the yield stress might be a variable influencing solution holdout properties of polymers, e.g. starch solutions, in contact with porous surfaces, e.g., paper.

The present invention includes compositions comprising an aqueous solution comprising a first ionic polymer and a viscosity promoter. The compositions are capable of exhibiting high yield stress at low viscosity.

Yield stress is measured in accordance with the procedure set out in the Examples section below. Preferred compositions of the present invention have yield stress values at least about 5 dynes/cm$^2$, more preferably at least about 10 dynes/cm$^2$, even more preferably at least about 20 dynes/cm$^2$, even more preferably at least about 30 dynes/cm$^2$, even more preferably at least about 50 dynes/cm$^2$, and most preferably at least about 70 dynes/cm$^2$. Although there is no specifically desired upper limit to the yield stress of a solution of the present invention, the yield stress will preferably be less than about 100 dynes/cm$^2$.

Compositions of the present invention exhibit increased yield stress compared to compositions which are missing either the first ionic polymer or viscosity promoter. Compositions of the present invention comprising moderating agent further exhibit increased yield stress compared to compositions which are missing the moderating agent. The yield stress of a composition of the present invention is preferably at least about 10% higher than the yield stress of a composition having the same viscosity and ingredients but for the absence of at least one of the first ionic polymer or viscosity promoter, more preferably at least about 50% higher, even more preferably at least about 100% higher, yet more preferably at least about 200% higher.

The viscosities of the solutions of the present invention are preferably such that the solutions are pourable and pumpable. Brookfield viscosities are measured in accordance with the procedure set out in the Examples section below. The Brookfield viscosity of a solution of ionic polymer/viscosity promoter according to the present invention is preferably less than about 10,000 cps, more preferably less than about 5,000 cps, even more preferably less than about 2,000 cps, even more preferably less than about 1,000 cps, even more preferably less than about 500 cps, even more preferably less than about 300 cps, and can be ad low as less than about 200 cps, or less than about 100 cps. The solution viscosity is preferably greater than about 50 cps, more preferably greater than about 100. Thus, preferred viscosity ranges include about 50 cps to 10,000 cps, more preferably, about 50 cps to 5,000 cps, even more preferably about 50 cps to 1,000 cps, even more preferably about 50 cps to 500 cps, even more preferably about 100 cps to 300 cps.

As noted above, compositions of the present invention include aqueous solutions comprising a first ionic polymer and a viscosity promoter. The first ionic polymer and the viscosity promoter can form an interactive complex of sufficiently high molecular weight to act non-Newtonian. Preferably, a high molecular weight interactive complex is obtained by having one or both of the first ionic polymer and viscosity promoter comprising a high polymer, i.e., have a high molecular weight. Preferably, the first ionic polymer is of high molecular weight.

The combination of the first ionic polymer and the vistosity promoter forms a true solution of interactive complex in aqueous media, such as water. The viscosity of the formed solution is greater than a solution of either the first ionic polymer or the viscosity promoter alone. In other words, the viscosity of the formed solution is greater than the viscosity of a solution containing the same amounts of the same ingredients, but without either the first ionic polymer or the viscosity promoter.

As noted above, either or both of the first ionic polymer and viscosity promoter is preferably a polymer with high molecular weight. By high molecular weight is meant a polymer which preferably has a molecular weight sufficiently high that a solution having 10 wt % or less of the polymer in water produces a Brookfield viscosity at ambient temperature in excess of about 1,000 cps. Although there is no preferred upper limit on the molecular weight of a high polymer, a solution having 1 wt % or less of a high polymer in water preferably produces a Brookfield viscosity less than about 10,000 cps.

Depending on the needs of the application, the first ionic polymer can be anionic, amphoteric, or cationic, so long as it has a net ionic charge. The first ionic polymer is preferably anionic or amphoteric, preferably having a net anionic charge, and is preferably anionic. The first ionic polymer is water-soluble, by which is meant that the polymer is capable of forming a non-colloidal 1 wt % aqueous solution at ambient temperature (about 25° C.).

The degree of ionic substitution can be determined based on the known structure of a polymer by the equation:

$$\text{ionic substitution (meq/g)} = \frac{1000}{|\text{molecular weight per charge}|} \quad (2)$$

The ionic substitution may also be determined experimentally, for example, by using the colloidal titration techniques.

The degree of ionic substitution of the first ionic polymer, which is preferably anionic, is preferably at least about 0.04 meq/g, more preferably at least about 0.5 meq/g, even more preferably at least about 0.1 meq/g, even more preferably at least about 1 meq/g, most preferably at least about 3 meq/g. The degree of ionic substitution is preferably less than about 10 meq/g, more preferably less than about 5 meq/g, even more preferably less than about 4 meq/g.

Ionic polymers which may be selected as the first ionic polymer are preferably anionic, and preferably have a high molecular weight. Thus, in a preferred aspect, anionic water-soluble polymers in combination with cationic viscosity promoters produce significantly enhanced yield stress and/or water retention at a given solution viscosity, compared to the control polymers without cationic viscosity promoters present. Thus, in a particular embodiment, the invention comprises a preferably aqueous solution of 1) as first ionic polymer, a high molecular weight anionic water-soluble polymer and; 2) as viscosity promoter, a polyvalent cationic additive, such as a high charge density water-soluble polymer, or a cationic inorganic additive, such as a calcium or aluminum salt.

Anionic water-soluble polymers according to the invention include, but are not limited to, sodium carboxymethylcellulose, sodium carboxymethyl hydroxyethylcellulose, pectin, carrageenan, carboxymethylguar gum, sodium alginate, anionic polyacrylamide copolymers, alkali-soluble latex, carboxymethyl methylcellulose, carboxymethyl hydroxypropyl guar, and other anionic carbohydrate derivatives, as well as mixtures including one or more of these polymers. Preferably, the anionic polymer includes sodium carboxymethylcellulose, sodium carboxymethyl hydroxyethylcellulose, pectin, carrageenan, carboxymethylguar gum, sodium alginate, anionic polyacrylamide copolymers and alkali-soluble latex, as well as mixtures including one or more of these polymers.

Commercially available products which may be used as the anionic water-soluble first ionic polymer, or as a component thereof, include CMC-9M31 (sodium carboxymethylcellulose; Hercules Incorporated), CMHC 420H (carboxymethyl hydroxyethylcellulose; Hercules Incorporated), Pectin LM104 AS-Z (anionic pectin; Hercules Incorporated), Carrageenan J (Hercules Incorporated), Galactosol (carboxymethyl guar gum, Hercules Incorporated), Alcogum L-29 (an alkali-soluble latex; Alco Products), Kelgin MV (sodium alginate; Kelco, San Diego), Reten 215 (anionic polyacrylamide; Hercules Incorporated), and others such as noted in the Examples below.

Cationic water-soluble polymers in the present invention include, but are not limited to, cationic polyacrylamide polymers and copolymers; epihalohydrin reaction products of polyaminoamides obtained by reaction of polyamines with dicarboxylic acids; and polymers of diallyldimethyl ammonium chloride (DADMAC) as well as mixtures including one or more of these polymers. Preferred among these are Reten 203 (Hercules Incorporated) and Kymene 557H (Hercules Incorporated).

The combination of first ionic polymer and viscosity promoter in aqueous solution increases the viscosity and/or yield stress compared to a solution absent either first ionic polymer or viscosity promoter. The viscosity promoter preferably comprises a second ionic polymer and/or a polyvalent salt. For example, when the first ionic polymer is an anionic polymer, the cationic additive employed as a viscosity promoter is either a cationic polymer, or a polyvalent cationic salt.

When the viscosity promoter comprises a second ionic polymer, the second ionic polymer includes an ionic polymer having a net ionic charge opposite to that of the first ionic polymer. It can have monomer units of the same sign as the net charge of the first ionic polymer so long as the net charge of the second ionic polymer is opposite that of the first ionic polymer.

When the viscosity promoter is a polymer, it can have a high or low molecular weight. If the first ionic polymer is a high molecular weight polymer, preferably an anionic first ionic polymer, then the polymer viscosity promoter is preferably of low molecular weight. By low molecular weight is meant that a 5 wt % solution of the polymer in water has a Brookfield viscosity at ambient temperature of less than about 2,000 cps when measured in accordance with the procedure described above. For the viscosity promoter, a high molecular weight polymer is one which is not a low molecular weight polymer, that is, a polymer for which a 5 wt % solution in water has a Brookfield viscosity at ambient temperature greater than about 2,000 cps.

A polymer used as viscosity promoter is preferably highly charged. By this is meant that the degree of charged character of these viscosity promoters is preferably greater than about 0.05 meq/g, more preferably greater than about 0.1 meq/g, even more preferably greater than about 1.0 meq/g, and most preferably greater than about 3 meq/g. While there is no preferable upper limit on the degree of charged character of the polymer viscosity promoter, its will generally be less than about 10 meq/g, more preferably less than about 5 meq/g, even more preferably less than about 4 meq/g. Polymers employed as viscosity promoters are preferably of low molecular weight and are highly charged.

Cationic water-soluble polymers as viscosity promoters include, but are not limited to, a) cationic polyacrylamide polymers and copolymers; b) epihalohydrin reaction products of polyaminoamides obtained by reaction of polyamines with dicarboxylic acids; and c) polymers of diallyldimethyl ammonium chloride (DADMAC). Cationic polyacrylamides of type (a) include copolymers of acrylamide or methacrylamide with cationic monomers such as DADMAC, methacryloxyethyltrimethyl ammonium chloride and acryloxyethyltrimethyl ammonium chloride. Mixtures including one or more of these polymers are also included.

A preferred cationic polymer of type (b) is Kymene® 557H available from Hercules Incorporated, Wilmington, Del. Kymene® 557H is the product of reaction of epichlorohydrin with a polyaminoamide derived by reaction product of adipic acid with diethylenetriamine. A preferred polymer of type (c) is Reten® 203, a poly(DADMAC) available from Hercules Incorporated, Wilmington, Del.

Anionic polymers as viscosity promoters include, but are not limited to, CMHEC, CMC, styrene maleic anhydride resins (SMA resins), polyacrylates, and copolymers thereof, as well as mixtures including one or more of these polymers.

Polyvalent salts which are useful as viscosity promoters in the present invention include salts having a polyvalent functionality. Thus, the polyvalent functionality may be anionic or cationic depending on the nature of the first ionic polymer. Any ions may be used to balance the charge of the polyvalent functionality.

Salts having a polyvalent cationic functionality, therefore, may be used as viscosity promoters for a first ionic polymer that is anionic. That the cationic functionality is polyvalent means that it has a valence of at least +2. Thus, preferred polyvalent cationic functionalities include those which are divalent, trivalent, tetravalent or greater, preferably divalent or trivalent. Preferably, salts of tetravalent metals, such as the group IVB transition metals, e.g., zirconium, are not included as viscosity promoters. Preferred salts having cationic polyvalent functionalities include salts of polyvalent metals, including alkaline-earth metals, transition metals, and group IIIA metals. Such salts include salts of aluminum, magnesium, iron III, calcium, and zinc. Preferred are salts of calcium and aluminum, such as aluminum acetate or calcium chloride. Mixtures including one or more of these salts, e.g., mixtures of two or more of the listed salts, may also be used.

As noted, mixtures of viscosity promoters are also within the scope of this invention. Thus, in addition to mixtures of salts or mixtures of second ionic polymers as referred to above, the viscosity promoter may also comprise a mixture of at least one salt and at least one second ionic polymer.

The first ionic polymer is preferably present at an excess, preferably a large excess, to the viscosity promoter in terms of charge ratio. To calculate the charge ratio, the ionic substitution of the first ionic polymer (e.g., as calculated from Equation 2, above) is multiplied by its weight to obtain the "total charge" of the first ionic polymer. The same is done for the viscosity promoter (whether, e.g., salt, polymer, or mixture), to obtain the "total charge" of the viscosity promoter. The "charge ratio" is obtained by taking the ratio of the total charge of the first ionic polymer to the viscosity promoter. It is preferred that the charge ratio of first ionic polymer to viscosity promoter is greater than 1:1, more preferably greater than about 1:0.6, more preferably greater than about 1:0.4, more preferably greater than about 1:0.3, even more preferably greater than about 1:0.2, most preferably greater than about 1:0.1.

In general, it is observed that when cationics, such as alum, Kymene 557H, or other cationics, are mixed with anionic polymers, such as carboxymethylcellulose, a precipitate or a gel can form. One hallmark of precipitate formation is that the viscosity of the composition decreases. Formation of a gel, in contrast, results in a composition of very high viscosity, whose viscosity cannot be easily adjusted through, e.g., dilution with an aqueous medium. To avoid the formation of a gel and/or precipitate, the anionic and cationic components may be mixed in the presence of a moderating agent. Thus, the use of a moderating agent results in a solution with enhanced viscosity and modified rheological properties.

Any material that prevents or reduces a precipitation and/or gelation between a cationic and anionic polymer may be used as a moderating agent. Preferred moderating agents are cationic or anionic. Preferred types of moderating agent include inorganic salts having a polyvalent cationic functionality, salts having an anionic functionality, and starch solutions.

Preferred cationic moderating agents include inorganic salts having a divalent cationic functionality, and include cationic salts useful as viscosity promoters. Thus, a cationic salt may be capable of acting as both viscosity promoter and as moderating agent in a composition of the present invention. Where a moderating agent comprises a cationic salt in a composition of the present invention, it is preferable that the cationic salt not also act as a viscosity promoter in that composition.

Preferred anionic moderating agents include salts having an anionic functionality. Salts having an anionic functionality are suitable for use with a first ionic polymer that is anionic or cationic. Such a salt is preferably a salt of a polybasic carboxylic acid. Thus, the anionic functionality is preferably carboxylate, of which there are preferably at least two carboxylate groups on the salt, i.e., preferred salts are salts of carboxylic acids. Preferred anionic functionalities include citrates, formates, bicarbonates, malates, malonates, acetates, oxalates, succinates, etc. Specific salts yielding anionic functionalities suitable for use in this invention include sodium citrate (e.g., trisodium citrate or disodium citrate), potassium citrate, sodium formate, potassium formate, sodium acetate, and low-viscosity sodium, potassium, or ammonium polyacrylates.

Additional moderating agents include starch solutions, preferably hot starch solutions. Without being bound by theory, although starches are generally considered nonionic, it is believed that starch molecules contain some carboxylate functionalities, which lend a slight degree of anionic character to the starch. Thus, it is believed that the effectiveness of starch solutions as moderating agents may be due to these carboxylate functionalities.

Thus, in another aspect of the present invention, there is provided an aqueous composition comprising a solution of a first ionic polymer, a viscosity promoter, and a moderating agent. Without wishing to be bound to any one theory, it is believed that, in this aspect of the invention, the viscosity promoter moderates the interactions between the ionic polymer and the viscosity promoter, thereby preventing precipitation or gelation which would occur in the absence of the moderating agent. That is, it is believed that the components form an "interactive complex," in which the ions of the moderating agent act as a "buffer" between the ionic polymer and the viscosity promoter. The interactive complex remains soluble in water and exhibits unusual rheological properties.

Aqueous compositions of first ionic polymer and viscosity promoter may be prepared by combining the ingredients in any order. Such compositions are preferably prepared by first dissolving an ionic polymer, either anionic or cationic, in water. The mixture is then preferably modified through the addition of a viscosity promoter. Additives, as described in more detail below, may also be used. When additives are used, they may be added at any stage, to any component. Preferably, additives are combined with the first ionic polymer, preferably in an aqueous medium, before combining with the viscosity promoter.

Aqueous compositions of ionic polymer, viscosity promoter, and moderating agent are prepared by adding the moderating agent to either the first ionic polymer or the viscosity promoter, preferably to the first ionic polymer, before combining the first ionic polymer and viscosity promoter. The moderating agent and the ingredient with which it is combined, whether first ionic polymer or viscosity promoter, can have net ionic charges of the same or opposite sign. It is also possible to mix the first ionic polymer with a first moderating agent, the viscosity promoter with a second moderating agent, then combine the thus obtained solutions.

The result of these procedures is modification of rheological properties compared to a solution containing the same amounts of the same ingredients, but without the ionic polymer, viscosity promoter, or moderating agent. Preferably, the rheologically modified composition has increased viscosity, and/or increased yield stress compared to solutions of the first ionic polymer, viscosity promoter, or moderating agent alone.

Without wishing to be bound by any theory, it is believed that the formation of an interactive complex enhances the yield stress of these solutions. Development of a significant solution yield stress value in a solution of low Brookfield viscosity represents a significant challenge in distinct contrast to the act of cross-linking a concentrated solution of polymer at high Brookfield viscosity to form a gel.

Another rheological property which is preferably modified in compositions of the present invention is the water retention. For many purposes, such as in papermaking compositions, it is desired to increase the water retention of a composition, to thereby decrease rate and degree of absorption into the paper. When measured by the method of gravimetric water retention (GWR), such as in accordance with the technique described in the Examples section below, water retention is given in units of $g/m^2$, and lower values indicate better retention.

Compositions of the present invention exhibit improved water retention compared to comparative compositions which are missing either the first ionic polymer or viscosity promoter. Thus, compositions of the present invention exhibit GWR values less than the GWR values of comparative compositions as defined above. The GWR of a composition of the present invention is preferably less than about 0.9 times the GWR of a comparative composition (i.e., at least about 10% less), more preferably less than about 0.8 times (i.e., at least about 20% less), and even more preferably less than about 0.7 times the GWR of a comparative composition (i.e., at least about 30% less). While there is no preferable lower limit on the GWR of the inventive compositions, the GWR is typically greater than about 0.01 times the GWR of a comparative composition, more typically greater than about 0.0125 times, even more typically greater than about 0.02 times, and even more typically greater than about 0.025 times the GWR of a comparative composition. Thus, preferred ranges for the GWR of compositions of the present invention include between about 0.9 and about 0.01 times the GWR of a comparative composition, more preferably between about 0.9 and about 0.0125 times the GWR of a comparative composition, even more preferably between about 0.8 and about 0.02 times the GWR of a comparative composition, and yet more preferably, between about 0.7 and about 0.025 times the GWR of a comparative composition.

Compositions and processes of the present invention are suitable for use in various areas. Such areas include, but are not limited to, surface coating of paper, internal addition of dry strength additives, latex paint thickening, oil field drilling mud, oil field fracturing fluids, water clarification, as a retention aid, in applications where a large yield stress is desired, and in applications where a reduction in surface absorption and/or reduced surface porosity is desired.

As desired for a particular application, compositions and processes of the present invention may include additives. When additives are used, as is preferable in papermaking, they preferably include any combination of sizing agents; natural, semisynthetic, or synthetic polymers (e.g., natural or modified starches); pigments; fillers; biocides; surfactants; antistatic agents; anti-foaming agents; binders (e.g., latices, proteins, starches); retention aids; and strengthening agents.

Compositions of the present invention can comprise aqueous solutions comprising the first ionic polymer and viscosity promoter by themselves or including a moderating agent, and can comprise aqueous compositions containing additives. Moreover, when compositions of the present invention incorporate additives, the compositions may be solutions, colloids (e.g., microemulsions, emulsions, and dispersions) or suspensions. Thus, compositions of the present invention can comprise additives, and include aqueous compositions which are solutions, emulsions, dispersions, or suspensions. Such compositions, and uses thereof, are within the scope of the present invention as comprising aqueous compositions of the present invention.

Compositions of the present invention may be used to increase the yield stress of aqueous compositions. Xanthan gum, a non-ionic polymer, has been discussed in numerous publications as exhibiting a pronounced yield stress in dilute aqueous solution. It was unexpectedly found that solutions of the present invention, which comprise a combination of at least two interactive species, provide higher yield stresses than xanthan gum at equivalent Brookfield viscosities, e.g., in dilute solutions, indicating that this invention could find widespread utility in applications, e.g., industrial applications, where an increased yield stress is desired.

In applications where it is desired to coat a porous surface, compositions and processes of the present invention may be used to increase the coating efficiency. By increasing the coating efficiency, compositions of the present invention can be used to increase filler content and/or reduce the amount of coating materials used. In the area of papermaking, for example, better coating efficiency afforded by the present invention can lead to reduced linting and dust, and can permit production of paper having reduced wood pulp content.

In papermaking, compositions may be applied in any manner, including externally, such as by surface coating in a size press, and/or internally, such as by addition to a pulp slurry. Preferably, compositions are applied to paper externally. The compositions may be applied as a paper coating in any amount determined useful for the particular application. Pigmented surface additives are typically applied in the amount of about 10% to 40% by weight, based on the dry weight of the paper, more preferably about 20% to 30% by weight, based on the dry weight of the paper. Non-pigmented surface additives, e.g., starch additives, are typically applied at a rate of about 3% to 10% by weight, based on the dry weight of the paper, more preferably about 5% to 8% by weight, based on the dry weight of the paper.

When solutions of the present invention are incorporated with additives, the viscosity ranges of these filled systems are expected to be higher than without additives. Viscosities may be determined by any method by a person of ordinary skill in the art for the particular application. When manufactured, sold, or transported as a concentrate, for example, the Brookfield viscosity can be as high as commercially practical, typically about 10,000 cps or less, such as 100–10,000 cps. When used as starch solutions, e.g., in papermaking, Brookfield viscosities are typically in the range of about 50 cps to 300 cps. When compositions of the present invention are used as pigmented paper coatings, Brookfield viscosities are typically in the range of about 1,000–5,000 cps. When compositions of the present invention are used in pigmented coatings such as latex paints, Stormer viscosities will typically be in the range of about 80 to about 120 krebs units.

As noted, compositions of the present invention may be in the form of concentrates. The concentrates may be later diluted or mixed with additives as needed. Such concentrates are concentrated in order to, e.g., reduce transportation costs and/or storage space. The concentrated form results in, inter alia, a higher viscosity than for the composition when diluted and prepared for use. There is no upper limit on the viscosities of such compositions. For convenience, however, the viscosities are preferably less than about 10,000 cps so that they are pourable and pumpable without specialized equipment.

When compositions or processes of the present invention are used with a sizing agent, any sizing agent may be used, preferably cellulose-reactive sizes. Preferred cellulose reactive sizes include ketene dimers and multimers, alkenylsuccinic anhydrides, styrene maleic anhydrides, organic epoxides containing from about 12 to 22 carbon atoms, acyl halides containing from about 12 to 22 carbon atoms, fatty acid anhydrides from fatty acids containing about 12 to 22 carbon atoms, and organic isocyanates containing from about 12 to 22 carbon atoms. Preferably, cellulose-reactive sizes used in compositions and processes of the present invention comprise alkyl ketene dimers, alkyl ketene multimers, and/or alkenylsuccinic anhydrides. Mixtures of sizing agents, preferably including at least one cellulose-reactive sizing agent, are also included in compositions and processes of the current invention.

Ketene dimers and multimers are materials of Formula I:

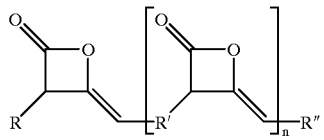

I wherein n is an integer of about 0 to about 20; R and R", which may be the same or different, are saturated or unsaturated straight chain or branched alkyl groups having 6 to 24 carbon atoms; and R' is a saturated or unsaturated straight chain or branched alkyl group having from about 2 to about 40 carbon atoms.

Ketene dimers have the structure of Formula I where n=0. Ketene dimers suitable for use in the present invention preferably include those in which the R and R" groups, which can be the same or different, are hydrocarbon radicals. Preferably, the R and R" groups are alkyl or alkenyl groups having 6 to 24 carbon atoms, cycloalkyl groups having at least 6 carbon atoms, aryl having at least 6 carbon atoms, aralkyl having at least 7 carbon atoms, alkaryl having at least 7 carbon atoms, and mixtures thereof. More preferably ketene dimer is selected from the group consisting of (a) octyl, decyl, dodecyl, tetradecyl, hexadecyl, octadecyl, eicosyl, docosyl, tetracosyl, phenyl, benzyl, β-naphthyl, and cyclohexyl ketene dimers, and (b) ketene dimers prepared from organic acids selected from the group consisting of montanic acid, naphthenic acid, 9,10-decylenic acid, 9,10-dodecylenic acid, palmitoleic acid, oleic acid, ricinoleic acid, linoleic acid, eleostearic acid, naturally occurring mixtures of fatty acids found in coconut oil, babassu oil, palm kernel oil, palm oil, olive oil, peanut oil, rape oil, beef tallow, lard, whale blubber, and mixtures of any of the above named fatty acids with each other. Most preferably, ketene dimer is selected from the group consisting of octyl, decyl, dodecyl, tetradecyl, hexadecyl, octadecyl, eicosyl, docosyl, tetracosyl, phenyl, benzyl, β-naphthyl, and cyclohexyl ketene dimers.

Suitable ketene dimers are disclosed in U.S. Pat. No. 4,279,794, and in United Kingdom Patent Nos. 903,416; 1,373,788 and 1,533,434, and in European Patent Application Publication No. 0,666,368 A3, corresponding to commonly owned U.S. Pat. No. 5,685,815. all of which are incorporated herein by reference in their entireties.

Ketene multimers for use in the process of this invention are disclosed in commonly owned U.S. Pat. No. 5,846,663, which is incorporated herein in its entirety. They have the formula 1 where n is an integer of at least 1, R and R", which may be the same or different, are saturated or unsaturated straight chain or branched alkyl group having 6 to 24 carbon atoms; preferably 10 to 20 carbon atoms, and more preferably 14 to 16 carbon atoms; and R' is a saturated or unsaturated straight chain or branched alkyl group having from 20 to 40 carbon atoms, preferably from 4 to 8 or from 28 to 40 atoms.

Ketene multimers are also described in EP 0,629,741 A1, incorporated herein in its entirety, and EP 0,666,368 A3, which corresponds to U.S. Pat. No. 5,685,815.

Particularly preferred groups of ketene dimers and multimers for use in the invention are liquid ketene dimers and multimers, which are those that are preferably not solid at 25° C. (not substantially crystalline, semi-crystalline or waxy solid; i.e., they flow on heating without heat of fusion). More preferably they are not solid at 20° C. Even more preferably they are liquid at 25° C., and most preferably liquid at 20° C. These liquid dimers and multimers are typically mixtures of compounds of Formula I in which n is preferably 0 to 6, more preferably 0 to 3, and most preferably 0; R and R", which can be the same or different, are saturated or unsaturated, straight chain or branched alkyl groups having 6 to 24 carbon atoms; R' is a saturated or unsaturated, straight chain or branched alkyl group having 2 to 40 carbon atoms, preferably 4 to 32 carbon atoms; and wherein at least 25% of the R and R" groups in the mixture of compounds is unsaturated.

The liquid ketene dimers and multimers may comprise a mixture of ketene dimer or multimer compounds that are the reaction product of a reaction mixture comprising unsaturated monocarboxylic fatty acids. The reaction mixture may further comprise saturated monocarboxylic fatty acids and dicarboxylic acids. Preferably the reaction mixture for preparing the mixture of dimer or multimer compounds comprises at least 25 wt % unsaturated monocarboxylic fatty acids, and more preferably at least 70 wt % unsaturated monocarboxylic fatty acids.

The unsaturated monocarboxylic fatty acids included in the reaction mixture preferably have 10–26 carbon atoms, more preferably 14–22 carbon atoms, and most preferably 16–18 carbon atoms. These acids include, for example, oleic, linoleic, dodecenoic, tetradecenoic (myristoleic), hexadecenoic (palmitoleic), octadecadienoic (linolelaidic), octadecatrienoic (linolenic), eicosenoic (gadoleic), eicosatetraenoic (arachidonic), cis-13-docosenoic (erucic), trans-13-docosenoic (brassidic), and docosapentaenoic (clupanodonic) acids, and their acid halides, preferably chlorides. One or more of the monocarboxylic acids may be used. Preferred unsaturated monocarboxylic fatty acids are oleic, linoleic, linolenic and palmitoleic acids, and their acid halides. Most preferred unsaturated monocarboxylic fatty acids are oleic and linoleic acids, and their acid halides.

The saturated monocarboxylic fatty acids used to prepare the ketene dimer and multimer compounds used in this invention preferably have 10–26 carbon atoms, more preferably 14–22 carbon atoms, and most preferably 16–18 carbon atoms. These acids include, for example, stearic, isostearic, myristic, palmitic, margaric, pentadecanoic, decanoic, undecanoic, dodecanoic, tridecanoic, nonadecanoic, arachidic and behenic acids, and their halides, preferably chlorides: One or more of the saturated monocarboxylic fatty acids may be used. Preferred acids are palmitic and stearic.

The alkyl dicarboxylic acids used to prepare the ketene multimer compounds for use in this invention preferably have 6–44 carbon atoms, and more preferably 9–10, 22 or 36 carbon atoms. Such dicarboxylic acids include, for example, sebacic, azelaic, 1,10-dodecanedioic, suberic, brazylic, docosanedioic acids, and C36 dimer acids, e.g. EMPOL 1008 available from Henkel-Emery, Cincinnati, Ohio, U.S.A., and their halides, preferably chlorides. One or more of these dicarboxylic acids can be used. Dicarboxylic acids with 9–10 carbon atoms are more preferred. The most preferred dicarboxylic acids are sebacic and azelaic acids.

When dicarboxylic acids are used in the preparation of the ketene multimers for use in this invention, the maximum mole ratio of dicarboxylic acid to monocarboxylic acid (the sum of both saturated and unsaturated) is preferably about 5. A more preferred maximum is about 4, and the most preferred maximum is about 2. The mixture of dimer and multimer compounds may be prepared using methods known for the preparation of standard ketene dimers. In the first step, acid halides, preferably, acid chlorides, are formed from a mixture of fatty acids, or a mixture of fatty acids and dicarboxylic acid, using PC13 or another halogenating, preferably chlorinating, agent. The acid halides are then converted to ketenes in the presence of tertiary amines (including trialkyl amines and cyclic alkyl amines), preferably triethylamine. The ketene moieties then dimerize to form the desire compounds.

Liquid ketene dimers and multimers suitable for use in this invention are disclosed in U.S. patent application Ser. No. 08/428,288, filed Apr. 25, 1995, which is incorporated herein by reference in its entirety, U.S. Pat. Nos. 5,685,815 and 5,846,663.

Alkyl ketene dimers are commercially available, as Aquapel® sizing agents, and in the dispersion form as Hercon® emulsion sizes from Hercules Incorporated, Wilmington, Del. Ketene dimers not solid at 25° C. are available as Precis® sizing agents, also from Hercules Incorporated.

Also included in the group of cellulose reactive sizes are alkenylsuccinic anhydrides (ASA). ASAs are composed of unsaturated hydrocarbon chains containing pendant succinic anhydride groups. They are usually made in a two-step process starting with alpha olefin. The olefin is first isomerized by randomly moving the double bond from the alpha position. In the second step the isomerized olefin is reacted with maleic anhydride to give the final ASA structure 2. Typical olefins used for the reaction with maleic anhydride include alkenyl, cycloalkenyl and aralkenyl compounds containing from 8 to about 22 carbon atoms. Specific examples are isooctadecenyl succinic anhydride, n-octadecenyl succinic anhydride, n-hexadecenyl succinic anhydride, n-dodecyl succinic anhydride, i-dodecenyl succinic anhydride, n-decenyl succinic anhydride and n-octenyl succinic anhydride.

Alkenylsuccinic anhydrides are disclosed in U.S. Pat. No. 4,040,900, which is incorporated herein by reference in its entirety, and by C. E. Farley and R. B. Wasser in *The Sizing of paper, Second Edition*, edited by W. F. Reynolds, Tappi Press, 1989, pages 51–62. A variety of alkenylsuccinic anhydrides is commercially available from Albemarle Corporation, Baton Rouge, Louisiana.

The amount of cellulose-reactive size is preferably an amount sufficient to provide a sizing effect to the composition. On the lower end, the amount of cellulose-reactive size in the composition is preferably greater than about 1 wt % of the weight of the aqueous composition, more preferably greater than about 5 wt %, and even more preferably greater than about 7 wt %. On the upper end, the amount of cellulose reactive size is preferably less than about 50 wt % of the weight of the aqueous composition, more preferably less than 30 wt %, and even more preferably less than 15 wt %. The amount of cellulose-reactive size in the composition is preferably from about 1 to about 50 wt % of the weight of the aqueous composition, more preferably from about 5 to about 30 wt %, and even more preferably from about 7 to about 15 wt %.

It has been found that it is difficult to predict in advance which anionic polymers and cationic ingredient combinations are effective in the present invention, except that this determination requires empirical methods. However, by following the guidelines set forth herein, no undue experimentation will be required by one of ordinary skill in the art to identify those specific combinations of anionic water soluble polymers with polyvalent cationic additives that produce the desired rheological effect for a given application.

In order to more clearly describe the present invention, the following non-limiting examples are provided.

EXAMPLES

As a means of demonstrating the characteristics and utility of the present invention, several tests are employed in the Examples, including tests for measuring gravimetric water retention, Hercules Size Test, and Gurley porosity. The procedures for these tests are as follows.

Gravimetric Water Retention (GWR):

Water retention is measured using a Gravimetric Water Analysis Tester (Kaltec Inc., Novi, Mich.). Unless otherwise stated, the test is performed at atmospheric pressure (a setting of "0") for a period of 30 seconds. In this test method, 10 grams of solution are added to a circular cylinder having a 1 square inch cross section, and placed in contact with a porous polycarbonate membrane (Part# GWR420, Kaltec Inc.). The membrane covers an absorbent pad (GWR test blotter paper, Kaltec Inc.). The absorbent pad is weighed before the solution is placed in the cup, and then again after 30 seconds of elapsed time of contact between the solution and the polycarbonate membrane. The amount of water weight gain of the absorbent pad is indicative of the water permeation of the solution through the membrane. A lower water weight gain of the absorbent pad indicates higher water retention capability of the solution. The gravimetric water retention value obtained by this method is given in units of $gms/m^2$, where lower GWR values are preferred as indicative of enhanced water retention.

Note that, in contrast to the yield stress, the water retention is not an intrinsic property of a composition, but describes the interaction of a composition with other materials. The water retention value, therefore, is affected by the nature, e.g., chemical composition, thickness and porosity, of the membrane used in making the measurement.

Hercules Size Test (HST):

In the Hercules Size Test (HST), a sheet of paper is laid under an ink solution containing 1% of formic acid and 1.2% of Naphthol Green B. The reflectance of the paper on the opposite side of the solution is initially measured and is then monitored as it falls due to the ink penetration. The HST time (in seconds) is the time taken for the reflectance to fall to 80% of its initial value. Higher HST values indicate higher sizing levels.

Gurley Porosity:

Gurley porosity measures the amount of time it takes for a known volume of air to flow through a sample. It is measured in seconds, and higher Gurley porosity values indicate lower sample porosity. Gurley porosity is measured using a Model 1 Air Permeability Tester (Hagerty Technologies, Inc., Queensbury, N.Y.) operated according to the manufacturer's specifications. The tester is set on the high pressure setting, and results given are averages of five runs.

Example 1

Solutions of various anionic water-soluble polymers are prepared in water at concentrations sufficient to produce stock solutions having Brookfield viscosities in excess of 500 cps. These stock solutions are then adjusted in concentration through the addition of supplemental water, and stirring to provide solutions having Brookfield viscosities of about 100, 200, and 300 cps. The solutions prepared are tested for gravimetric water retention as described above.

For comparative purposes, the same anionic water-soluble polymer solutions described above are modified by the addition to each of various cationically charged additives as viscosity promoters. In most of these cases, a significant increase in the Brookfield viscosity of the solution is observed after mixing this with the cationic species. Each solution of water-soluble polymer that is modified with cationic additive is then diluted with supplemental water addition to produce solutions with viscosities of about 100 cps, 200 cps, and 300 cps. The so-prepared solutions are then tested for gravimetric water retention in the same manner as the control solutions. The standard solution water retention test results are shown alongside the results for cationically modified solutions in the following Tables.

In Table 1A, the first ionic polymer is sodium carboxymethylcellulose (CMC-9M31; Hercules Incorporated, Wilmington, Del.) and the viscosity promoter is basic aluminum acetate (NIAPROOF; obtained from Union Carbide, New York, N.Y.).

TABLE 1A

SODIUM CARBOXYMETHYLCELLULOSE

| First Ionic Polymer CMC-9M31 weight % | Viscosity Promoter NIAPROOF weight % | Solution Brookfield Viscosity, cps | Gravimetric Water Retention grams/m$^2$ |
|---|---|---|---|
| 2% | — | 1450 cps | |
| 1.25% | — | 310 | 805 |
| 1.11% | — | 218 | 932 |
| 0.86% | — | 110 | >1000 scale |
| 1.95% | 0.039% | 39,000 | |
| 0.64% | 0.0129% | 300 | 288 |
| 0.53% | 0.0105% | 210 | 403 |
| 0.39% | 0.0078% | 109 | >1000 |

In Table 1B, the first ionic polymer is sodium carboxymethyl hydroxyethylcellulose (CMHEC 420H; Hercules Incorporated, Wilmington, Del.) and the viscosity promoter is a cationic polyDADMAC (RETEN 203; Hercules Incorporated, Wilmington, Del.).

TABLE 1B

CARBOXYMETHYL HYDROXYETHYLCELLULOSE

| First Ionic Polymer CMHEC 420H weight % | Viscosity Promoter Reten 203 weight % | Solution Brookfield Viscosity, cps | Gravimetric Water Retention grams/m$^2$ |
|---|---|---|---|
| 1% | — | 1,920 | — |
| 0.54% | — | 290 | 970 |
| 0.49% | — | 205 | >1000 |
| 0.37% | — | 110 | >1000 |
| 0.98% | 0.117% | 11,250 | — |
| 0.21% | 0.025% | 296 | 27 |
| 0.19% | 0.023% | 210 | 22 |
| 0.11% | 0.013% | 105 | 120 |

In Table 1C, the first ionic polymer is anionic pectin (unstandardized) (LM103 AS-Z; Hercules Incorporated, Wilmington, Del.) and the viscosity promoter is calcium chloride.

TABLE 1C

PECTIN

| First Ionic Polymer Pectin LM104 AS-Z (unstandardized), Hercules weight % | Viscosity Promoter calcium chloride weight % | Solution Brookfield Viscosity, cps | Gravimetric Water Retention grams/m$^2$ |
|---|---|---|---|
| 4% | — | 688 | — |
| 3.13% | — | 320 | 135 |
| 2.66% | — | 200 | 335 |
| 2.16% | — | 108 | 751 |
| 3.75% | 0.063% | 27,750 | — |
| 1.82% | 0.031% | 317 | 60 |
| 1.70% | 0.029% | 211 | 191 |
| 1.25% | 0.021% | 102 | >1000 |

In Table 1D, the first ionic polymer is an anionic carrageenan (CARRAGEENAN J; Hercules Incorporated, Wilmington, Del.) and the viscosity promoter is basic aluminum acetate NIAPROOF; obtained from Union Carbide, New York, N.Y.) or a dilute cationic polyDADMAC (RETEN 203; Hercules Incorporated, Wilmington, Del.), as indicated.

TABLE 1D

CARRAGEENAN

| First Ionic Polymer Carrageenan J weight % | Viscosity Promoter weight % | Solution Brookfield Viscosity, cps | Gravimetric Water Retention grams/m$^2$ |
|---|---|---|---|
| 1% | — | 1,836 | |
| 0.52% | — | 300 | 980 |
| 0.45% | — | 208 | >1000 |
| 0.38% | — | 104 | >1000 |
| 0.98% | NIAPROOF/0.039% | 6,730 | |
| 0.53% | NIAPROOF/0.021% | 320 | 59 |
| 0.39% | NIAPROOF/0.016% | 185 | 55 |
| 0.32% | NIAPROOF/0.013% | 86 | 81 |
| 0.98% | RETEN 203/0.12% | 17,900 | — |
| 0.12% | RETEN 203/0.05% | 288 | off scale |

In Table 1E, the first ionic polymer is an anionic carboxymethyl guar gum with a D.S. of 0.5, and the viscosity promoter is basic aluminum acetate (NIAPROOF; obtained from Union Carbide, New York, N.Y.) or a dilute cationic polyDADMAC (RETEN 203; Hercules Incorporated, Wilmington,Del.), as indicated.

TABLE 1E

CARBOXYMETHYLGUAR

| First Ionic Polymer Carboxymethyl guar gum weight % | Viscosity Promoter weight % | Solution Brookfield Viscosity, cps | Gravimetric Water Retention grams/m$^2$ |
|---|---|---|---|
| 1% | — | 432 | — |
| 0.88% | — | 308 | 922 |
| 0.74% | — | 216 | >1000 |
| 0.59% | — | 113 | >1000 |
| 0.98% | NIAPROOF/0.0392% | 726 | — |
| 0.74% | NIAPROOF/0.029% | 320 | 875 |
| 0.68% | NIAPROOF/0.027% | 200 | 945 |
| 0.56% | NIAPROOF/0.022% | 120 | >1000 |
| 0.98% | RETEN 203/0.118% | 1,916 | — |
| 0.21% | RETEN 203/0.020% | 296 | >1000 |
| 0.17% | RETEN 203/0.019% | 204 | 796 |
| 0.13% | RETEN 203/0.016% | 104 | >1000 |

In Table 1F, the first ionic polymer is an alkali-soluble latex (ALCOGUM L-29; Alco Products, Chattanooga, Tenn.), and the viscosity promoter is basic aluminum acetate (NIAPROOF; obtained from Union Carbide, New York, N.Y.).

TABLE 1F

ALKALI-SOLUBLE LATEX

| First Ionic Polymer ALCOGUM L-29 weight % | Viscosity Promoter NIAPROOF weight % | Solution Brookfield Viscosity, cps | Gravimetric Water Retention grams/m$^2$ |
|---|---|---|---|
| 5% | — | 308 | 77 |
| 4.16% | — | 214 | 175 |
| 2.38% | — | 109 | 256 |
| 4.88% | 0.039% | 382 | — |
| 4.07% | 0.032% | 276 | 37 |
| 3.36% | 0.027% | 211 | 78 |
| 2.03% | 0.016% | 113 | 151 |

In Table 1G, the first ionic polymer is a sodium alginate (KELGIN MV; Kelco, San Diego), and the viscosity promoter is calcium chloride.

TABLE 1G

SODIUM ALGINATE

| First Ionic Polymer Kelgin MV weight % | Viscosity Promoter calcium chloride weight % | Solution Brookfield Viscosity, cps | Gravimetric Water Retention grams/m$^2$ |
|---|---|---|---|
| 2% | — | 3,016 | — |
| 1.05% | — | 304 | 17 |
| 0.88% | — | 187 | 22 |
| 0.68% | — | 115 | 42 |
| 1.88% | 0.062% | 44,900 | — |
| 0.72% | 0.024% | 273 | 14 |
| 0.57% | 0.019% | 203 | 15 |
| 0.46% | 0.015% | 119 | 15 |

In Table 1H, the first ionic polymer is an anionic polyacrylamide (RETEN 215; Hercules Incorporated, Wilmington, Del.), and the viscosity promoter is basic aluminum acetate (NIAPROOF; OBTAINED from Union Carbide, New York, N.Y.).

TABLE 1H

ANIONIC POLYACRYLAMIDE

| First Ionic Polymer RETEN 215 weight % | Viscosity Promoter NIAPROOF weight % | Solution Brookfield Viscosity, cps | Gravimetric Water Retention grams/m$^2$ |
|---|---|---|---|
| 0.5% | — | 730 | — |
| 0.15% | — | 288 | 137 |
| 0.14% | — | 215 | 158 |
| 0.07% | — | 113 | 643 |
| 0.44% | 0.032% | 3,028 | — |
| 0.20% | 0.015% | 290 | 11 |
| 0.15% | 0.011% | 224 | 14 |
| 0.098% | 0.007% | 127 | 52 |

Comparative Example 1

It is attempted to prepare interactive complexes of water-soluble polymers, such as anionic polyacrylamide copolymers and xanthan gum, with cationic additives, similar to the experiments shown in Tables 1A–H above. It is also attempted to prepare interactive mixtures of cationic and anionic guar, as shown in Table 1I. However, in all of these cases, no rheological benefits are observed in mixtures of these particular water-soluble polymers and cationic additives.

The fact that anionic polyacrylamide does not provide the rheological benefit of improved water retention when mixed with cationic additives may be the result of this polymer's tendency to strongly precipitate when mixed with cationic species, as is shown in Tables 1J and 1K. This finding shows that the prior art description of mixtures of anionic and cationic polyacrylamide copolymers useful for paper making must involve an entirely different mechanism than the present invention. The discussion of the use of anionic and cationic mixtures of the prior art clearly does not lead to the present invention based upon these findings. Moreover, the failure to prepare mixtures of either cationic or anionic polyacrylamide copolymers with oppositely charged additives that were useful for the property of improved water retention (Tables 1J, 1K, and 1M), or to prepare mixtures of cationic guar with anionic guar useful for the property of improved water retention (Table 1L) leads to the conclusion that the present invention of effective combinations of oppositely charged ingredients to provide an enhanced water retention property is not obvious from the prior art usages of these particular polymers.

TABLE 1I

XANTHAN GUM

| Water-Soluble Polymer KELTROL RD (Kelco Inc.) xanthan gum weight % | Cationic Additive weight % | Solution Brookfield Viscosity, cps | Gravimetric Water Retention grams/m$^2$ |
|---|---|---|---|
| 1% | — | 1,144 | — |
| 0.29% | — | 336 | 962 |
| 0.17% | — | 188 | >1000 |
| 0.98% | RETEN 203/0.117% | 2,176 | — |
| 0.23% | RETEN 203/0.027% | 312 | >1000 |
| 0.19% | RETEN 203/0.022% | 220 | >1000 |
| 0.98% | NIAPROOF/0.039% | 8,045 | — |

TABLE 1I-continued

XANTHAN GUM

| Water-Soluble Polymer KELTROL RD (Kelco Inc.) xanthan gum weight % | Cationic Additive weight % | Solution Brookfield Viscosity, cps | Gravimetric Water Retention grams/m$^2$ |
|---|---|---|---|
| 0.32% | NIAPROOF/0.012% | 315 | >1000 |
| 0.24% | NIAPROOF/0.009% | 213 | off scale |

TABLE 1J

ANIONIC POLYACRYLAMIDE

| Water-Soluble Polymer RETEN 235 (Hercules Incorporated) anionic polyacrylamide weight % | Cationic Additive weight % | Solution Brookfield Viscosity, cps | Gravimetric Water Retention grams/m$^2$ |
|---|---|---|---|
| 0.5% | — | 2,382 | |
| 0.28% | — | 310 | 27 |
| 0.19% | — | 215 | 31 |
| 0.098% | — | 117 | 53 |
| 0.5% | 0.0083% Reten 203 | strong precipitate | — |
| | | 4,475 | |
| 0.147% | 0.0024% Reten 203 | 320 | 31.3 |
| 0.096% | 0.0016% Reten 203 | 225 | 54 |
| 0.049% | 0.0008% Reten 203 | 122 | 250 |
| 0.5% | 0.01% Galactosol 813S Hercules cationic guar | strong precipitate | |

TABLE 1K

ANIONIC POLYACRYLAMIDE

| Water-Soluble Polymer RETEN 215 (Hercules Incorporated) anionic polyacrylamide weight % | Cationic Additive Reten 203 weight % | Solution Brookfield Viscosity, cps | Gravimetric Water Retention grams/m$^2$ |
|---|---|---|---|
| 0.5% | — | 730 | |
| 0.15% | — | 288 | 137 |
| 0.14% | — | 215 | 158 |
| 0.07% | — | 113 | 643 |
| 0.5% | 0.0076% | 730 strong precipitate | — |
| 0.21% | 0.0030% | 284 | 306 |
| 0.15% | 0.0022% | 195 | 589 |
| 0.09% | 0.0014% | 120 | 732 |

TABLE 1L

MIXTURES OF ANIONIC GUAR AND CATIONIC GUAR

| Anionic Guar carboxymethylguar gum (D.S. 0.5) weight % | Cationic Guar GALACTOSOL 813S (Hercules Incorporated) weight % | Solution Brookfield Viscosity, cps |
|---|---|---|
| 1% | — | 353 |
| — | — | 1,707 |
| 0.5% | 0.5% | 49 |
| 0.34% | 0.66% | 146 |

TABLE 1M

CATIONIC POLYACRYLAMIDE COPOLYMER

| Water-Soluble Polymer PERCOL 745 (Allied Colloids) cationic polyacrylamide copolymer weight % | Anionic Additive CMHEC-420 carboxymethyl hydroxyethylcellulose weight % | Solution Brookfield Viscosity, cps |
|---|---|---|
| 0.5% | — | 345 cps |
| 0.5% | 0.01% | strong precipitate |

Example 2

Selected solutions from Example 1 are measured for yield stress values at very low shear rate employing a Bohlin rheometer. The solutions include a control solution of non-ionic xanthan gum, and solutions of CMHEC 420, with and without cationic additives present. All solutions tested are prepared to constant Brookfield viscosities by diluting stock solutions until viscosities of about 300 cps are obtained. It is found in these tests that the yield stress values of the anionic water-soluble polymer solution with cationic additive present, at a given Brookfield viscosity, are significantly higher than the anionic polymer alone or the xanthan control solution. These results are shown in Table 2.

These findings are significant for indicating potential utilitarian properties, since xanthan gum, a non-ionic polymer, is currently employed in many industrial applications due to its high yield stress, which is well established in the technical literature. It is thus evident that aqueous solutions of any newly discovered water-soluble polymer mixtures, that exhibit yield stress values of greater magnitude than that of xanthan gum at a given low viscosity, is an unexpected discovery. Thus, the present invention includes low viscosity solutions of water-soluble polymers in combination with cationic additives, which exhibit yield stress values in excess of about 30 dynes/cm$^2$.

TABLE 2

YIELD STRESS COMPARISONS OF XANTHAN GUM COMPARED TO WATER-SOLUBLE POLYMER ANIONIC/CATIONIC COMPLEXES

| First Ionic Polymer | weight % | Viscosity Promoter Reten 203 weight % | Solution Brookfield Viscosity, cps | Yield Stress, dyne/cm$^2$ |
|---|---|---|---|---|
| Keltrol RD xanthan gum (non-ionic, control) | 0.29% | — | 336 | 12.5 |
| CMHEC-420H sodium carboxymethyl cellulose | 0.57% | — | 290 | 10.1 |
| CMHEC-420H sodium carboxymethyl cellulose | 0.21% | 0.025% | 296 | 39.8 |

Example 2B

In this Example, it is demonstrated that complexes of anionic water-soluble polymers with cationic complexing agents can produce yield stress values at a given Brookfield viscosity that significantly exceed the yield stress values of natural gums. The finding of means to produce these pronounced yield stress values in low viscosity solutions is in itself an unexpected discovery, and the fact that utility of this property has been identified, though this was not previously recognized in the prior art, also represents an unexpected discovery.

In each of Tables 2B and 2C, the components are added sequentially in descending rows.

Solutions of xanthan gum in water are prepared by adding 15 parts by weight of the gum to 985 parts by weight of water, and stirring to dissolve for two hours to prepare a stock solution. Aliquots of the stock solution are adjusted in concentration by adding additional water, as shown in Table 2B, to produce Brookfield viscosities of either about 1000 cps (RVT #2/12 RPM) or about 500 cps.

Solutions of sodium alginate in water are prepared by adding 20 parts by weight of Scogin® MV sodium alginate to 980 parts by weight of distilled water, and stirring to dissolve for two hours to prepare a stock solution. Aliquots of the stock solution are adjusted in concentration, by adding additional water as shown in Table 2B, to produce Brookfield viscosities of either about 1000 cps (#2/12 RPM) or about 500 cps.

A stock solutions of CMC-7H3SC complexed with aluminum sulfate in water, is prepared by adding 10 parts by weight of the CMC-7H3SC to 990 parts by weight distilled water, stirring to dissolve for two hours, and adding in 30 parts by weight magnesium sulfate, followed by 20 parts by weight of 2% aluminum sulfate 18-hydrate. This is observed to form a weak gel. Aliquots of the stock solution are adjusted in concentration, by adding additional water as shown in Table 2B, to produce Brookfield viscosities of about 1000 cps (LVT #2/12 RPM) or about 500 cps.

Solutions of three rheological modifiers in aqueous starch solution were prepared by first cooking and dissolving a 10% solution of Penford 280 ethylated starch in distilled water, then dissolving into this the various gums and ingredients shown in Table 2C. The Brookfield viscosities of these solutions are then adjusted to achieve the target values of about 500 cps and 1000 cps by adding additional aliquots of 10% Penford 280 starch solution, which had the effect of adjusting the concentrations of the gums to a level that would produce the desired viscosities.

Yield stress measurements for the above polymer solutions are conducted employing an AR 1000 rheometer (TA Instruments) with standard methodology.

TABLE 2B

| COMPONENTS (parts by weight) | 1 | 2 | 3 | 4 | 5 | 6 |
|---|---|---|---|---|---|---|
| Initial water | 980 | 985 | 990 | 980 | 985 | 990 |
| CMC-7H3SC | | | 10 | | | 10 |
| Keltrol ® RD xanthan gum | | 15 | | | 15 | |
| Scogin MV sodium alginate | 20 | | | 20 | | |
| Epsom salt added | | | | 30 | | 30 |
| 2% alum added | | | | 20 | | 20 |
| adjusting water added | 333 | 3000 | 213 | 652 | 4769 | 261 |
| RESULTS | | | | | | |
| Brookfield viscosity at 25° C., LVT #2/12 RPM | 1000 cps | 1010 cps | 1070 cps | 480 cps | 515 cps | 530 cps |
| Yield Stress (dyne/cm$^2$) | 3.23 | 12.5 | 13.7 | 0.7 | 6.09 | 8.9 |

TABLE 2C

| COMPONENTS (parts by weight) | 1 | 2 | 3 | 4 | 5 | 6 |
|---|---|---|---|---|---|---|
| 10% Penford 280 starch solution at 65° C. | 100 | 100 | 100 | 100 | 100 | 100 |
| Kymene 557H cationic resin @ 10% active | | | 1.2 | | | 0.9 |

TABLE 2C-continued

| COMPONENTS (parts by weight) | 1 | 2 | 3 | 4 | 5 | 6 |
|---|---|---|---|---|---|---|
| Keltrol RD xanthan gum | 1 | | | 1 | | |
| Scogin MV sodium alginate | | 1.5 | | | 1.5 | |
| CMC-7H3SC | | | 0.4 | | | 0.3 |
| 10% Penford 280 starch solution at 65° C. | 147 | — | 60 | 256 | 2 | 100 |
| RESULTS | | | | | | |
| Brookfield viscosity at 65° C., LVT #2/12 RPM | 1082 cps | 960 cps | 1025 cps | 550 cps | 515 cps | 475 cps |
| Yield Stress (dyne/cm$^2$) | 12.33 | 0.76 | 54.96 | 5.88 | 0.28 | 16.98 |

As shown in Table 2B, in the aqueous solutions without starch, it is found that the yield stress values of the CMC/aluminum solution complexes are higher than those of the xanthan gum and sodium alginate solutions at the same Brookfield viscosities.

As shown in Table 2C, in the solutions of starch that contained the various gums and gum complexes, it was found that the yield stress of the CMC/Kymene 557H complex was significantly greater than that of sodium alginate and xanthan gum controls.

Example 3

Aqueous solutions of CMHEC 420H carboxymethyl hydroxyethylcellulose are prepared with cationic modifier, and various sizing agents are added as supplemental additives to these solutions. The supplemental additives are styrene maleic anhydrides (Scripset 740 and 742; Hercules Incorporated), a ketene multimer sizing agent made from 2 moles sebacic acid and 1 mole of unsaturated fatty acids (PTD D-898; Hercules Incorporated), an emulsion of alkyl ketene dimer made from linoleic and oleic acids (PRECIS; Hercules Incorporated) and a latex colloid sizing agent (Chromaset 600, Hercules Incorporated).

It is found that the mixtures of anionic water-soluble polymer and cationic modifier form compatible solutions with each of these additives, with the exception of alkenyl succinic anhydride. It is established that the technology of the present invention would be operable for use in surface sizing applications in conjunction with sizing agents and colloids. These results are shown in Tables 3A and 3B.

TABLE 3A

MIXTURES OF AN ANIONIC FIRST IONIC POLYMER AND CATIONIC VISCOSITY PROMOTER WITH SIZING AGENTS

| Components: | 1 | 2 | 3 | 4 | 5 | 6 |
|---|---|---|---|---|---|---|
| 0.25% CMHEC-420H solution, gms | 400 | 400 | 400 | 400 | 400 | 400 |
| Dilute Reten 203, (6% active) gms | 10 | 10 | 10 | 10 | 10 | 10 |
| Scripset 740 (Hercules), gms | 40 | | | | | |
| Scripset 742 (Hercules), gms | | 40 | | | | |
| AQU D-898 (Hercules) sizing agent | | | 40 | | | |
| Chromaset 600 (Hercules) sizing agent | | | | 40 | | |
| Precis (Hercules) sizing agent | | | | | 40 | |
| alkenyl succinic anhydride | | | | | | 40 |
| Solution Brookfield Viscosity, cps | 24 | 11 | 4 | 23 | 5 | ppt. |
| Gravimetric Water Retention grams/m$^2$ | 134 | 270 | >1000 | 14 | >1000 | — |

TABLE 3B

MIXTURES OF AN ANIONIC FIRST IONIC POLYMER AND CATIONIC VISCOSITY PROMOTER WITH BENTONITE CLAY

| First Ionic Polymer CMHEC-420H weight % | VOLCLAY HPM-75 bentonite (Am. Colloid) weight % | Viscosity Promoter RETEN 203 weight % | Solution Brookfield Viscosity, cps | Gravimetric Water Retention grams/m$^2$ |
|---|---|---|---|---|
| 0.98 | 1.96% | — | 2,928 | |
| 0.49 | 0.98% | — | 285 | 868 |
| 0.43% | 0.86% | — | 205 | 957 |
| 0.20% | 0.41% | — | 111 | >1000 |
| 0.96% | 1.92% | 0.12% | 10,200 | |
| 0.25% | 0.49% | 0.030% | 185 | 40 |
| 0.20% | 0.38% | 0.024% | 100 | 64 |

Example 4

An aqueous solution of 10% Penford gum 280 hydroxyethylated starch (Penford Products, Iowa) is prepared by cooking the gum in water for one hour at 95° C. with 0.20% by weight of CMMEC-420H carboxymethyl hydroxyethylcellulose (Hercules Incorporated, Wilmington, Del.). The thickened starch solution is then cooled to 70° C., and partitioned into aliquots. Sizing agent is added to the thickened starch solution, then dilute Reten 203 cationic polymer is added in aliquots to the starch solution. This solution, at different stages of cationic additive level, is measured for Brookfield viscosity and gravimetric water retention. It is found in these tests that the water retention performance enhancement is observed to increase as more cationic additive is added. These results are shown in Table 4. This example shows the potential for producing enhanced sizing results by utilizing the present invention with starch and sizing agents for surface treatment of paper.

TABLE 4

USE OF AN ANIONIC FIRST IONIC POLYMER AND CATONIC VISCOSITY PROMOTER WITH DISSOLVED STARCH AND SIZING AGENT

| Components: | 1 | 2 | 3 | 4 | 5 |
|---|---|---|---|---|---|
| 0.20% CMHEC-420H/10% Penford 280 starch solution, gms | 450 | 450 | 450 | 450 | 450 |
| sodium bicarbonate, gms | 0.2 | 0.2 | 0.2 | 0.2 | 0.2 |
| Scripset 740 (Hercules), gms | 50 | 50 | 50 | 50 | 50 |
| Dilute Reten 203, (6% active), gms | 2 | 4 | 6 | 8 | IO |
| Solution Brookfield viscosity at 70° C., cps | 55 | 68 | 85 | 110 | 148 |
| Gravimetric Water Retention grams/m² | >1000 | 690 | 163 | 36 | 35 |

Example 5

Compositions of an ionic polymer (sodium carboxymethyl cellulose), a viscosity promoter (KYME 557H), and a moderating agent (hydroxyethylated starch) are prepared as follows. An aqueous solution of 8% hydroxyethylated starch (PENFORD GUM 280) is prepared by cooking the gum in water for one hour at 95° C. with 0.25% by weight of sodium carboxymethyl cellulose (CMC-7H3SX; Hercules Incorporated, Wilmington, Del.). The thickened starch solution is then cooled to 70° C. and partitioned. Various levels of Kymene 557H (Hercules Incorporated, Wilmington, Del.) are added to aliquots of the starch solution, and these are compared for Brookfield viscosity and gravimetric water retention. It is observed that the addition of Kymene 557H increases both the viscosity and the water retention of the solution relative to the control test without Kymene 557H. These results are shown in Table 5A.

In a parallel test, compositions without the moderating agent are prepared. A 1% solution of CMC-7H3SX is prepared, then the solution is measured for Brookfield viscosity. A small quantity of Kymene 557H cationic polymer is added to the CMC solution with stirring. In this comparative experiment, however, a precipitate is observed, and the viscosity of the solution decreases as more Kymene 557H is added. This indicates a depletion of the CMC polymer from the aqueous phase. This is shown in Table 5B.

This example shows that the presence of dissolved starch as a moderating agent allowed for the use of a combination of CMC and a cationic modifier to achieve the useful solution property of enhanced water retention, whereas the absence of the dissolved starch moderating agent leads to precipitation, and is ineffective for use of Kymene with CMC for enhanced water retention.

TABLE 5A

CMC AND STARCH MODIFIED WITH VISCOSITY PROMOTER

| Moderating Agent PENFORD 280 ethylated starch solution | First Ionic Polymer CMC-7H3S weight % | Viscosity Promoter KYMENE 557H weight % | Solution Brookfield Viscosity (at 70° C.) | Gravimetric Water Retention, gm/m² |
|---|---|---|---|---|
| 8% | 0.25% | 0.025% | 190 cps | 35 |
| 8% | 0.25% | 0.050% | 230 cps | 33 |
| 8% | 0.25% | 0.075% | 255 cps | 31 |
| 8% | 0.25% | — | 170 cps | 170 |

TABLE 5B

MIXTURE OF CMC SOLUTION WITH KYMENE 557H

| First Ionic Polymer CMC-7H3SX weight % | Viscosity Promoter KYMENE 577H weight % | Solution Brookfield Viscosity, cps |
|---|---|---|
| 1% | — | 1100 cps |
| 0.99% | 0.012% | 700 cps, precipitate |
| 0.98% | 0.024% | 540 cps, precipitate |

Example 6

An aqueous solution of 8% Penford Gum 280 hydroxyethylated starch is prepared by cooking the gum in water for one hour at 95° C. The starch solution is cooked with 0.25% by weight of CMC-7H3S (Hercules). The thickened starch solution is then cooled to 70° C. and partitioned. Various levels of Kymene 557H are added to aliquots of the starch solution, and these are compared for Brookfield viscosity and gravimetric water retention.

The starch solutions thus obtained are then employed to surface treat uncoated paper sheets employing a wire rod draw-down method. The so-treated paper sheets are dried at constant temperature, and humidity then measured for dry starch pickup and Gurley porosity with a Hagerty digital porosimeter (Hagerty Technologies Inc., Queensbury, N.Y.). It is found in these tests that the combined CMC/Kymene 557H modifier system produces much higher Gurley porosity values of the treated paper sheets than the control tests. These results are shown in Table 6. Higher Gurley porosity is a desired property in size press treated paper. This example demonstrates utility of the present invention to provide valuable flow properties to solutions of starch employed to surface treat paper.

TABLE 6

USE OF CMC AND STARCH IN COMBINATION WITH KYMENE ® 557H FOR USE IN SURFACE TREATING PAPER SHEETS

| Viscosity Promoter KYMENE 557H weight % | Solution Brookfield Viscosity | Gravimetric Water Retention g/m² | starch pickup on paper weight % | Gurley porosity (treated paper) |
|---|---|---|---|---|
| 0.025% | 190 cps | 35 | 1.7 | 314 |
| 0.050% | 230 cps | 33 | 1.9 | 294 |
| 0.075% | 255 cps | 31 | 1.0 | 605 |
| — | 170 cps | 170 | 2.1 | 254 |

Example 7

A rotogravure paper coating formulation is prepared by dispersing 200 grams of Hydraprint delaminated clay (J M Huber, Macon, Ga.) and 200 grams of Hydrasperse #2 kaolin clay (J M Huber, Macon, Ga.) into 400 grams water, then mixing this with 48 grams of RAP 3 B3NABK (50% active) rotogravure latex (Dow Inc., Midland, Mich.). The mire is then adjusted to about pH 8.5–9.0 with ammonia hydroxide to obtain a stock mixture.

To a given quantity of the stock mixture, base formula rheological modifiers are added to thicken the mixture. In the control case Polyphobe 205 associative thickener (Uion Carbide, Danbury, Conn.), that is known to be a commercially employed thickener for rotogravure paper coatings, is employed to thicken the coating. In a comparative test experiment, CMHEC-420H is dissolved in the base coating formula, then a cationic polymer modifier, RETEN 203, is added to the system.

The paper coating properties of the control and comparative test are then measured. It is found that the combination of CMHEC-420H with cationic additive provide significantly better water retention than the control test while providing a low Hercules High-Shear value similar to the control case. These findings, shown in Table 7, indicate utility of the present invention to provide desirable novel properties to paper coatings.

TABLE 7

COMPARISON OF THICKENING AGENTS FOR PAPER COATING

| | | |
|---|---|---|
| water, grams | 400 | 400 |
| delaminated clay, grams | 200 | 200 |
| #2 pigment, grams | 200 | 200 |
| rotogravure latex (50%), grams | 48 | 48 |
| ammonia to pH 8.5–9 | | |
| Polyphobe 205, (Union Carbide), | — | 5.4 grams |
| CMHEC 420, stir to dissolve | 0.8 grams | — |
| Coating Brookfield (RVT) Viscosity | 408 cps | 650 cps |
| Dilute Reten 203, (6% active) | 13.6 grams | — |
| Coating Brookfield RVT Viscosity | 610 cps | — |
| GWR water retention (2 atm. pressure, 60 seconds duration) | 359 gm/m2 | 441 gm/m2 |
| Hercules Hi-shear Viscosity, at 46,000 sec-1 shear rate, 2nd pass | 12 cps | 12 cps |

Example 8

A mixed solution of 10% by weight of Penford 280 hydroxyethylated starch and 0.2% by weight CMHEC-420H is prepared in water by adding these ingredients to the water with stirring then cooking the solution at elevated temperature of 95° C. for at least one hour. To 1000 parts by weight of this solution various agents are added and the effects of these additives on viscosity and GWR water retention were measured.

In the control cases, solutions of mixed aluminum sulfate with citric acid, according to the prior art of U.S. Pat. No. 4,035,195 are added to the starch solution. These are shown in Table 1Y, columns 2 and 4. In a comparative experiment a cationic polymer of the present invention is added to the starch/CMHBC-420H solution. These are shown in Table 1Y, columns 1 and 3. Portions of these compositions are adjusted either to pH 6.5 (columns 1 and 2) or to pH 8.5 (columns 3 and 4), through the addition of sufficient ammonium hydroxide.

As shown in Table 1Y, it is found that the solution viscosity enhancement is significantly greater with the CMHEC/cationic additive of the present invention compared to the mixed CMHEC/alum/citrate of the prior art. It is also found that, at pH 8.5, the water retention of the present invention was significantly greater than the control prior art. It could thus be shown that adding mixed aluminum sulfate/sodium citrate solution, as in the prior art U.S. Pat. No. 4,035,195, is not operable in the present invention to improve the solution water retention at the high pH condition, that would be typical of many size press applications.

TABLE 8A

EFFECTS OF ALUMINUM SULFATE/SODIUM CITRATE ON CMHEC

| | 1 | 2 (control) | 3 | 4 (control) |
|---|---|---|---|---|
| 10% Penford gum 280/0.2% CMHEC 420H solution, parts by weight | 1000 | 1000 | 1000 | 1000 |
| 3.2% aluminum sulfate/0.4% citric acid, parts by weight | — | 9.4 | — | 9.4 |
| 6% solids dilute Reten 203, parts by weight | 4 | — | 4 | — |
| pH* | 6.5 | 6.5 | 8.5 | 8.5 |
| solution viscosity | 131 | 97 | 418 | 65 |
| GWR water retention, gm/m² at 30 seconds | 71 | 48 | 105 | 299 |

*pH adjusted with ammonium hydroxide

Comparative Example 8B

A 1% solution of CMC-7H3S is prepared in water and the viscosity is measured. To 1000 parts by weight of this solution, 26 parts by weight of Bacote 20 (Magnesium Elektron) ammonium zirconium carbonate are added with stirring. It is found that the solution viscosity decreases with Bacote 20 addition. In separate experiments this viscosity lowering effect is found over a wide range of ammonium zirconium carbonate addition levels. Both the CMC and the CMC/zirconium solutions are mixed with further dilution water to produce solutions of approximately 300 cps viscosity and the GWR water retentions are measured. It is found that the two. CMC solutions, both with and without zirconium added, exhibit very similar water retention values. These results are shown in Table 8B. It is thus shown that adding zirconium salt, as in the prior art U.S. Pat. No. 5,362,573, is not operable in the present invention to improve the solution water retention.

TABLE 8B

EFFECTS OF ZIRCONIUM SALT ON SOLUTION PROPERTIES OF CMC

|  | 1 | 2 | 3 | 4 |
|---|---|---|---|---|
| 1% CMC-7H3S solution, parts | 1000 | 1000 | 1000 | 1000 |
| Bacote 20 ammonium zirconium carbonate, parts | — | — | 26 | 26 |
| dilution water, parts | — | 400 | — | 320 |
| solution viscosity | 824 cps | 318 cps | 638 cps | 292 cps |
| GWR water retention, gm/m² at 30 seconds | — | 754 | — | 754 | sizing agent, or c) a combination of both. The M1322 sizing agent, a dispersion of an alkenyl ketene dimer, is a product of Hercules Incorporated. The dimer is liquid at room temperature. Kymene 557H, a polyamide with cationic azetidinium functionality, is made and sold by Hercules Incorporated as a wet strength additive for paper. CMC-7H3SC is a carboxymethylcellulose made by Hercules Incorporated. The sample of CMC-7H3SC used in this Example has a degree of substitution of 0.7 (i.e., 70% of the methylhydroxy groups of the cellulose are reacted to form carboxy groups). The samples are evaluated for sizing (water hold-out) as measured by the standard Hercules Sizing Test (HST). Results are given in Table 9.

TABLE 9

|  | a | b1 | c1 | b2 | c2 | b3 | c3 |
|---|---|---|---|---|---|---|---|
| Kymene 557H (g/m² dry paper) | 0.014 | — | 0.014 | — | 0.014 | — | 0.014 |
| CMC-7H3SC (g/m² dry paper) | 0.039 | — | 0.039 | — | 0.039 | — | 0.039 |
| M1322 dimer (g/m² dry paper) | — | 0.036 | 0.036 | 0.040 | 0.040 | 0.054 | 0.054 |
| HST (sec.) | 0 | 31 | 70 | 56 | 126 | 102 | 137 |

Example 9

Paper having a basis weight of 99 g/m² is prepared on a commercial paper machine from a combination of soft and hard wood pulps. The paper has 12% ash by weight and the filler used is an HO-type precipitated silica. Other typical paper making additives are used, but the paper contains no added internal sizing agent, and the paper is not treated at a size press. The paper is dried and stored in reel form.

The paper is then treated on a pilot film transfer size press equipped with a metering rod to control the level of additive solution. The rod meters the solution onto a coating roll which then transfers the treatment to the paper. The treated paper is passed through a drier section and rewound onto a reel.

The paper is treated with the starch and additives only on one side. During the coating process, the paper moves at 3500 linear feet/min. The components of the rheology modifying system and sizing agent are added separately to the starch solution. The cationic resin is added first, and the sizing agent added last. The paper is coated with the size press solution within six minutes of adding the sizing agent. The rheology modifying system increased the starch viscosity to about 80 cps. After aging for more than two weeks, samples are taken from the final reel for evaluation.

In each case, the amount of starch added is 1.8 dry g/m2 of the dry paper. The starch solution is used at pH 8 and at 57° C., and has a Brookfield viscosity of about 20 cps with spindle 1 and 100 rpm. The rheology modifying system comprises Kymene 557H and CMC-7H3SC, and is added to the paper in the amounts shown in Table 9.

The paper is treated with an 8% ethylated starch solution to which is added a) a rheology modifying system, b) a Addition of the rheology modifier with the sizing agent increases the level of paper HST sizing obtained from each level of sizing agent. The rheology modifier alone gives no increase in paper sizing for the conditions of the test.

Example 10

Under ordinary circumstances, when a solution of carboxymethylcellulose (CMC) in water is mixed with a solution of a highly cationic polymer, such as Kymene 557H, a precipitate is typically observed to form, with a concomitant decrease in viscosity. Such mixtures do not exhibit a significant thickening effect when added to a paper coating composition. This example illustrates that a mixture of an anionic polymer, a cationic polymer, and a moderating agent is an effective thickener for paper coating composition.

10 parts of CMC-9L1EL are dissolved in 100 parts water, then 5 parts sodium citrate are dissolved in the water, followed by 48 parts of Kymene 557H cationic resin. A clear solution is observed. The solution noticeably thickens over the course of two days storage, but does not gel. A parallel experiment incorporating 80 parts of Kymene 557H as the final component forms a viscous clear solution after two days of storage.

The CMC/Kymene solution formed above is added into a paper coating containing kaolin clay and calcium carbonate pigments and SBR latex at 64% solids. A ratio of 5 parts of CMC/Kymene solution complex is added to 100 parts by weight of the paper coating. The Brookfield viscosity of the coating is observed to increase from 200 cps to 5,000 cps indicating a very strong thickening effect, and the so-thickened coating is very smooth in appearance without the formation of any lumps or visible agglomerate.

In a control experiment, a small amount of Kymene 557H is titrated into the same paper coating composition. In this case, severe pigment agglomeration is observed that consists of variable sized hard clumps in the coating.

Although the invention has been described with reference to particular means, materials and embodiments, it is to be understood that the invention is not limited to the particulars disclosed, and extends to all equivalents within the scope of the claims.

What is claim is:

1. An aqueous composition comprising at least one first ionic polymer, said first ionic polymer being an anionic polymer, and at least one viscosity promoter, said at least one viscosity promoter comprising at least one second ionic polymer having a net ionic charge opposite to that of said at least first ionic polymer, wherein the charge ratio of the at least one first ionic polymer to the at least one viscosity promoter is greater than 1:1, said aqueous composition having a yield stress greater than about 5 dynes/cm$^2$.

2. The aqueous composition of claim 1, wherein said aqueous composition has a yield stress greater than about 10 dynes/cm$^2$.

3. The aqueous composition of claim 2, wherein said aqueous composition has a yield stress greater than about 20 dynes/cm$^2$.

4. The aqueous composition of claim 3, wherein said aqueous composition has a yield stress greater than about 30 dynes/cm$^2$.

5. The aqueous composition of claim 4, wherein said aqueous composition has a yield stress greater than about 50 dynes/cm$^2$.

6. The aqueous composition of claim 5, wherein said aqueous composition has a yield stress greater than about 70 dynes/cm$^2$.

7. The aqueous composition of claim 1, wherein said aqueous composition has a Brookfield viscosity less than about 10,000 cps.

8. The aqueous composition of claim 7, wherein said aqueous composition has a Brookfield viscosity less than about 5,000 cps.

9. The aqueous composition of claim 8, wherein said aqueous composition has a Brookfield viscosity less than about 1,000 cps.

10. The aqueous composition of claim 9, wherein said aqueous composition has a yield stress greater than about 10 dynes/cm$^2$.

11. The aqueous composition of claim 10, wherein said aqueous composition has a yield stress greater than about 20 dynes/cm$^2$.

12. The aqueous composition of claim 11, wherein said aqueous composition has a yield stress greater than about 30 dynes/cm$^2$.

13. The aqueous composition of claim 9, wherein said aqueous composition has a Brookfield viscosity less than about 500 cps.

14. The aqueous composition of claim 13, wherein said aqueous composition has a yield stress greater than about 10 dynes/cm$^2$.

15. The aqueous composition of claim 14, wherein said aqueous composition has a yield stress greater than about 20 dynes/cm$^2$.

16. The aqueous composition of claim 15, wherein said aqueous composition has a yield stress greater than about 30 dynes/cm$^2$.

17. The aqueous composition of claim 13, wherein said aqueous composition has a Brookfield viscosity less than about 300 cps.

18. The aqueous composition of claim 17, wherein said aqueous composition has a yield stress greater than about 10 dynes/cm$^2$.

19. The aqueous composition of claim 18, wherein said aqueous composition has a yield stress greater than about 20 dynes/cm$^2$.

20. The aqueous composition of claim 19, wherein said aqueous composition has a yield stress greater than about 30 dynes/cm$^2$.

21. The aqueous composition of claim 17, wherein said aqueous composition has a Brookfield viscosity greater than about 50 cps.

22. The composition of claim 1, wherein said at least one first ionic polymer is a polymer having a net anionic charge and said at least one second ionic polymer is a polymer having a net cationic charge.

23. The aqueous composition of claim 22 wherein said at least one first ionic polymer has a net anionic charge of at least about 0.04 meq/gram.

24. The aqueous composition of claim 22 wherein said at least one first ionic polymer comprises at least one member selected from the group consisting of anionic polysaccharides, anionic polysaccharide derivatives, and anionic synthetic polymers.

25. The aqueous composition of claim 22 wherein said at least one first ionic polymer comprises at least one anionic polysaccharide selected from the group consisting of carrageenan, pectin, or sodium alginate.

26. The aqueous composition of claim 22 wherein said at least one first ionic polymer comprises at least one anionic polysaccharide derivative selected from the group consisting of carboxymethyl cellulose, carboxymethyl guar, carboxymethylhydroxypropyl guar, carboxymethylhydroxyethyl cellulose, methylcarboxymethyl cellulose and carboxymethyl starch.

27. The aqueous composition of claim 22 wherein said at least one first ionic polymer comprises at least one anionic polysaccharide derivative which is a carboxymethyl cellulose.

28. The aqueous composition of claim 22 wherein said at least one first ionic polymer comprises at least one anionic polysaccharide derivative which is carboxymethylydroxyethyl cellulose.

29. The aqueous composition of claim 22 wherein said at least one first ionic polymer comprises at least one anionic synthetic polymer selected from the group consisting of anionic acrylamide copolymer, amphoteric acrylamide copolymer, polyacrylic acid or acrylic acid copolymer.

30. The aqueous composition of claim 22 wherein a solution having 10 wt % or less of said at least one first ionic polymer in water has a Brookfield viscosity at ambient temperature in excess of about 1,000 cps.

31. The aqueous composition of claim 22 wherein said at least one first ionic polymer comprises at least one member selected from the group consisting of sodium carboxymethylcellulose; sodium carboxymethyl hydroxyethylcellulose; pectin; carrageenan; carboxymethylguar gum; sodium alginate; anionic polyacrylamide copolymers; alkali-soluble latex; carboxymethyl methylcellulose; and carboxymethyl hydroxypropyl guar.

32. The aqueous composition of claim 22 wherein said at least one first ionic polymer is carboxymethylhydroxyethyl cellulose and said at least one viscosity promoter is a polymer of diallyldimethyl ammonium chloride.

33. The aqueous composition of claim 22 wherein said at least one first ionic polymer is carboxymethyl cellulose and said at least one viscosity promoter is an epichlorohydrin reaction product of a polyaminoamide obtained by reaction of adipic acid.

34. The aqueous composition of claim 22 wherein said at least one second ionic polymer comprises at least one member selected from the group consisting of cationic polyacrylamide; epihalohydrin reaction product of polyaminoamides obtained by reaction of polyamines with dicarboxylic acids; and polymers of diallyldimethyl ammonium chloride.

35. The aqueous composition of claim 22 wherein said at least one second ionic polymer comprises at least one member selected from the group consisting of cationic polyacrylamide; epihalohydrin reaction product of polyaminoamides obtained by reaction of polyamines with dicarboxylic acids; polymer of diallyldimethyl ammonium chloride, polyamide-epichlorohydrin resins, polymerization products of quaternary monomers, copolymers of quaternary monomers with other reactive monomers, and adducts of quaternary epoxides with water-soluble polymers.

36. The aqueous composition of claim 22 wherein said at least one viscosity promoter further includes at least one inorganic salt having a polyvalent functionality.

37. The aqueous composition of claim 22 wherein said at least one viscosity promoter comprises at least one multivalent metal cation.

38. The aqueous composition of claim 37 wherein said at least one viscosity promoter comprises a salt of at least one member selected from the group consisting of aluminum, magnesium, iron III, calcium, and zinc.

39. The aqueous composition of claim 22 wherein a solution having 5 wt % of said at least one second ionic polymer in water has a viscosity has a Brookfield viscosity at ambient temperature less than about 2,000 cps.

40. The aqueous composition of claim 39, wherein said at least one second ionic polymer has a charge density of at least about 0.05 meq/g.

41. The aqueous composition of claim 1, wherein said at least one second ionic polymer has a charge density of at least about 0.05 meq/g.

42. The aqueous composition of claim 1, wherein said charge ratio is greater than about 1:0.6.

43. The aqueous composition of claim 42, wherein said charge ratio is greater than about 1:0.4.

44. The aqueous composition of claim 43, wherein said charge ratio is greater than about 1:0.3.

45. The aqueous composition of claim 44, wherein said charge ratio is greater than about 1:0.2.

46. The aqueous composition of claim 45, wherein said charge ratio is greater than about 1:0.1.

47. The aqueous composition of claim 1, further comprising at least one sizing agent.

48. The aqueous composition of claim 47 wherein said at least one sizing agent comprises at least one cellulose-reactive sizing agent.

49. The aqueous composition of claim 47 wherein said at least one sizing agent comprises at least one member selected from the group consisting of alkyl ketene dimer, alkyl ketene multimer, succinic acid anhydride, styrene maleic anhydride, styrene maleic anhydride copolymer, starch, hydrophobic latex polymer, organic epoxide, acyl halide, fatty acid anhydride, and organic isocyanate.

50. The aqueous composition of claim 1, having a gravimetric water retention value that is at least about 10% smaller than a composition having the same ingredients at the same concentrations but for the absence of either said at least one first ionic polymer or said at least one second ionic polymer.

51. The aqueous composition of claim 1 further comprising at least one moderating agent present in an amount effective to prevent formation of precipitate or gel, said precipitate or gel comprising an interactive complex of said at least one first ionic polymer and said at least one viscosity promoter, which precipitate or gel would form in the absence of said moderating agent.

52. The aqueous composition of claim 51, wherein said at least one moderating agent comprises at least one member selected from the group consisting of an inorganic salt having a divalent cationic functionality, salt of a carboxylic acid, and a starch solution.

53. The aqueous composition of claim 51 further having a yield stress greater than about 10 dynes/cm$^2$.

54. The aqueous composition of claim 1, further comprising at least one additive selected from the group consisting of sizing agent; natural, semisynthetic, or synthetic polymer; pigment; clay; filler; biocide; surfactant; antistatic agent; anti-foaming agent; binder; retention aid; and strengthening agent.

55. The aqueous composition of claim 1 further including clay.

56. The aqueous composition of claim 1, further including at least one pigment.

57. The aqueous composition of claim 56, further including at least one latex colloid.

58. The aqueous composition of claim 1 that is a surface sizing composition further comprising starch.

59. The aqueous composition of claim 1, wherein said aqueous composition is an oil field drilling mud.

60. The aqueous composition of claim 1, wherein said aqueous composition is an oil field fracturing fluid.

61. The aqueous composition of claim 1, wherein said aqueous composition is a water clarification composition.

62. The aqueous composition of claim 61, further comprising at least one surfactant.

63. The aqueous composition of claim 61, further comprising at least one anti-foaming agent.

64. The aqueous composition of claim 1, wherein said aqueous composition is a retention aid.

65. A process for surface sizing paper comprising: a) providing paper; b) applying the aqueous composition of claim 59 to at least one surface of the paper; and c) drying the paper to obtained surface sized paper.

66. The aqueous composition of claim 1 that is a paper coating composition further comprising pigment and latex binder.

67. The aqueous composition of claim 66 that has a lower gravimetric water retention than a paper coating composition containing no viscosity promoter.

68. The aqueous composition of claim 1 wherein said aqueous composition is a solution.

69. The aqueous composition of claim 1 wherein said aqueous composition is an emulsion.

70. A process for coating paper comprising: a) providing paper; b) applying the aqueous composition of claim 1 to at least one surface of the paper; and c) drying the paper to obtained coated paper.

71. A method of reducing porosity of a porous surface comprising applying the composition of claim 1 to said porous surface.

72. An aqueous composition prepared by combining at least one first ionic polymer, at least one viscosity promoter, and an aqueous medium, said at least one first ionic polymer being an anionic polymer and said at least one viscosity promoter comprising at least one second ionic polymer having a net ionic charge opposite to that of said first ionic polymer, wherein the charge ratio of first ionic polymer to viscosity promoter is greater than 1:1, said aqueous composition having a yield stress greater than about 5 dynes/cm$^2$.

73. The aqueous composition of claim 72, wherein said aqueous composition has a yield stress greater than about 10 dynes/cm$^2$.

74. The aqueous composition of claim 70, wherein said aqueous composition has a yield stress greater than about 20 dynes/cm$^2$.

75. The aqueous composition of claim 74, wherein said aqueous composition has a yield stress greater than about 30 dynes/cm$^2$.

76. The aqueous composition of claim 72, wherein said aqueous composition has a Brookfield viscosity less than about 500 cps.

77. The aqueous composition of claim 76, wherein said aqueous composition has a yield stress greater than about 10 dynes/cm$^2$.

78. The aqueous composition of claim 77, wherein said aqueous composition has a yield stress greater than about 20 dynes/cm$^2$.

79. The aqueous composition of claim 78, wherein said aqueous composition has a yield stress greater than about 30 dynes/cm$^2$.

80. The aqueous composition of claim 72, wherein said aqueous composition has a Brookfield viscosity less than about 300 cps.

81. The aqueous composition of claim 80, wherein said aqueous composition has a yield stress greater than about 10 dynes/cm$^2$.

82. The aqueous composition of claim 81, wherein said aqueous composition has a yield stress greater than about 20 dynes/cm$^2$.

83. The aqueous. composition of claim 82, wherein said aqueous composition has a yield stress greater than about 30 dynes/cm$^2$.

84. The composition of claim 72, wherein said at least one first ionic polymer is a polymer having a net anionic charge and said at least one second ionic polymer is a polymer having a net cationic charge.

85. The aqueous composition of claim 72 further comprising at least one moderating agent present in an amount effective to prevent formation of precipitate or gel, said precipitate or gel comprising an interactive complex of said at least one first ionic polymer and said at least one viscosity promoter, which precipitate or gel would form in the absence of said moderating agent.

86. An aqueous composition comprising water, at least one first ionic polymer and at least one viscosity promoter, said at least one first ionic polymer being an anionic polymer and said at least one viscosity promoter comprising at least one ionic polymer having a net ionic charge opposite to that of said first ionic polymer, wherein the charge ratio of first ionic polymer to viscosity promoter is greater than 1:1, said aqueous composition having a yield stress at least about 10% higher than the yield stress of a composition having about the same viscosity as said aqueous composition and the same ingredients as said aqueous composition but for the absence of at least one of said at least first ionic polymer or at least one viscosity promoter.

87. The aqueous composition of claim 86, wherein said aqueous composition has a Brookfield viscosity less than about 500 cps.

88. The aqueous composition of claim 87, wherein said aqueous composition has a Brookfield viscosity less than about 300 cps.

89. The aqueous, composition of claim 86, wherein said aqueous composition has a yield stress at least about 50% greater than the yield stress of said composition.

90. The aqueous composition of claim 89, wherein said aqueous composition has a yield stress at least about 100% greater than the yield stress of said composition.

91. The aqueous composition of claim 90, wherein said aqueous composition has a yield stress at least about 200% greater than the yield stress of said composition.

92. The aqueous composition of claim 89, wherein said aqueous composition has a Brookfield viscosity less than about 500 cps.

93. The aqueous composition of claim 92, wherein said aqueous composition has a Brookfield viscosity less than about 300 cps.

94. The aqueous composition of claim 87, wherein said aqueous composition has a yield stress at least about 100% greater than the yield stress of said composition.

95. The aqueous composition of claim 90, wherein said aqueous composition has a Brookfield viscosity less than about 500 cps.

96. The aqueous composition of claim 95, wherein said aqueous composition has a Brookfield viscosity less than about 300 cps.

97. The aqueous composition of claim 89 wherein said at least one first ionic polymer is a polymer having a net anionic charge, and said at least one cationic polymer is a polymer having a net cationic charge.

98. The aqueous composition of claim 86 further comprising at least one moderating agent present in an amount effective to prevent formation of precipitate or gel, said precipitate or gel comprising an interactive complex of said at least one first ionic polymer and said viscosity promoter, which precipitate or gel would form in the absence of said moderating agent.

99. The aqueous composition of claim 98, wherein said aqueous composition has a Brookfield viscosity less than about 500 cps.

100. The aqueous composition of claim 99, wherein said aqueous composition has a Brookfield viscosity less than about 300 cps.

101. The aqueous composition of claim 98, wherein said aqueous composition has a yield stress at least about 20% greater than the yield stress of said composition.

102. The aqueous composition of claim 101, wherein said aqueous composition has a Brookfield viscosity less than about 500 cps.

103. The aqueous composition of claim 98, wherein said aqueous composition has a Brookfield viscosity less than about 300 cps.

104. The aqueous composition of claim 101, wherein said aqueous composition has a yield stress at least about 50% greater than the yield stress of said composition.

105. The aqueous composition of claim 104, wherein said aqueous composition has a Brookfield viscosity less than about 500 cps.

106. The aqueous. composition of claim 104, wherein said aqueous composition has a Brookfield viscosity less than about 300 cps.

107. The aqueous composition of claim 98 wherein said at least one first ionic polymer is a polymer having a net anionic charge, and said at least one cationic polymer is a polymer having a net cationic charge.

108. An aqueous composition comprising water, at least one first ionic polymer and at least one viscosity promoter, said at least one first ionic polymer being an anionic polymer and said at least one viscosity promoter comprising at least one ionic polymer having a net ionic charge opposite to that of said first ionic polymer, wherein the charge ratio of first ionic polymer to viscosity promoter is greater than 1:1, said aqueous composition having a viscosity greater than the viscosity of a composition having about the same viscosity as said aqueous composition , and the same ingredients as said aqueous composition but for the absence of at least one of said at least first ionic polymer or at least one viscosity promoter, where the concentration of an ingredient is measured as weight % based on total weight.

109. The aqueous composition of claim 108, wherein said aqueous composition has a yield stress that is at least about 10% greater than that of said compositions.

110. The aqueous composition of claim 109, wherein said aqueous composition has a yield stress that is at least about 20% greater than that of said composition.

111. The aqueous composition of claim 110, wherein said aqueous composition has a yield stress that is at least about 50% greater than that of said composition.

112. The composition of claim 108, wherein said at least one first ionic polymer is a polymer having a net anionic charge and said at least one second ionic polymer is a polymer having a net cationic charge.

113. The aqueous composition of claim 112, wherein said aqueous composition has a yield stress that is at least about 10% greater than that of said composition.

114. The aqueous composition of claim 108, further comprising at least one moderating agent, said at least one moderating agent being present in an amount effective to prevent formation of a precipitate or gel, said precipitate or gel comprising an interactive complex of said at least one first ionic polymer and said at least one viscosity promoter.

115. The aqueous composition of claim 114, wherein said aqueous composition has a yield stress that is at least about 10% greater than that of said composition.

116. The aqueous composition of claim 115, wherein said aqueous composition has a yield stress that is at least about 20% greater than that of said composition.

117. The aqueous composition of claim 116, wherein said aqueous composition has a yield stress that is at least about 50% greater than that of said composition.

118. The composition of claim 114, wherein said at least one first ionic polymer is a polymer having, a net anionic charge and said at least one second ionic polymer is a polymer having a net cationic charge.

119. The aqueous composition of claim 118, wherein said aqueous composition has a yield stress that is at least about 10% greater than that of said composition.

120. An aqueous composition comprising at least one ionic polymer, at least one viscosity promoter, and at least one moderating agent, said at least one ionic polymer being an anionic polymer, said at least one viscosity promoter comprising at least one ionic polymer having a net ionic charge opposite to that of said first ionic polymer, wherein the charge ratio of the at least one ionic polymer to viscosity promoter is greater than 1:1, said moderating agent being present in an amount effective to prevent formation of a precipitate or gel, said precipitate or gel comprising an interactive complex of said at east one first ionic polymer and said at least one viscosity promoter.

121. The aqueous composition of claim 120, wherein said aqueous composition has a yield stress greater than about 5 dynes/cm$^2$.

122. The aqueous composition of claim 121, wherein said aqueous composition has a yield stress greater than about 10 dynes/cm$^2$.

123. The aqueous composition of claim 122, wherein said aqueous composition has a yield stress greater than about 20 dynes/cm$^2$.

124. The aqueous composition of claim 123, wherein said aqueous composition has a yield stress greater than about 30 dynes/cm$^2$.

125. The aqueous composition of claim 120, wherein said aqueous composition has a Brookfield viscosity less than about 500 cps.

126. The aqueous composition of claim 125, wherein said aqueous composition has a yield stress greater than about 5 dynes/cm$^2$.

127. The aqueous composition of claim 120, wherein said aqueous composition has a yield stress greater than about 20 dynes/cm$^2$.

128. The aqueous composition of claim 127, wherein said aqueous composition has a yield stress greater than about 20 dynes/cm$^2$.

129. The aqueous. composition of claim 128, wherein said aqueous composition has a yield stress greater than about 30 dynes/cm$^2$.

130. The aqueous composition of claim 129, wherein said aqueous composition has a Brookfield viscosity less than about 300 cps.

131. The aqueous composition of claim 130, wherein said aqueous composition has a yield stress greater than about 5 dynes/cm$^2$.

132. The aqueous composition of claim 131, wherein said aqueous composition has a yield stress greater than about 10 dynes/cm$^2$.

133. The aqueous composition of claim 132, wherein said aqueous composition has a yield stress greater than about 20 dynes/cm$^2$.

134. The aqueous composition of claim 133, wherein said aqueous composition has a yield stress greater than about 30 dynes/cm$^2$.

135. The composition of claim 133, wherein said at least one first ionic polymer is a polymer having a net anionic charge.

\* \* \* \* \*

UNITED STATES PATENT AND TRADEMARK OFFICE
CERTIFICATE OF CORRECTION

| | | |
|---|---|---|
| PATENT NO. | : 6,359,040 B1 | Page 1 of 1 |
| DATED | : March 19, 2002 | |
| INVENTOR(S) | : Burdick, Charles L. | |

It is certified that error appears in the above-identified patent and that said Letters Patent is hereby corrected as shown below:

<u>Title page,</u>
Item [57],
ABSTRACT line 1, change:
Aqueous compositions having advantage Theological properties, preferably including any of enhanced yield stress, enhanced viscosity, and/or enhanced water retension, are disclosed.

to read

Aqueous compositions having advantage rheological properties, preferably including any of enhanced yield stress, enhanced viscosity, and/or enhanced water retension, are disclosed.

Signed and Sealed this

Eighteenth Day of June, 2002

*Attest:*

*Attesting Officer*

JAMES E. ROGAN
*Director of the United States Patent and Trademark Office*